(12) United States Patent
Izumi et al.

(10) Patent No.: US 9,593,464 B2
(45) Date of Patent: Mar. 14, 2017

(54) CONSTRUCTION MACHINE

(71) Applicant: Hitachi Construction Machinery Co., Ltd., Tokyo (JP)

(72) Inventors: Shiho Izumi, Hitachinaka (JP); Kouji Ishikawa, Kasumigaura (JP); Shinya Imura, Toride (JP); Shinji Nishikawa, Kasumigaura (JP); Tomoaki Kaneta, Kasumigaura (JP); Hiroaki Amano, Kasumigaura (JP)

(73) Assignee: Hitachi Construction Machinery Co., Ltd., Tokyo (JP)

(*) Notice: Subject to any disclaimer, the term of this patent is extended or adjusted under 35 U.S.C. 154(b) by 0 days.

(21) Appl. No.: 15/023,829

(22) PCT Filed: Dec. 20, 2013

(86) PCT No.: PCT/JP2013/084353
§ 371 (c)(1),
(2) Date: Mar. 22, 2016

(87) PCT Pub. No.: WO2015/092933
PCT Pub. Date: Jun. 25, 2015

(65) Prior Publication Data
US 2016/0312440 A1    Oct. 27, 2016

(51) Int. Cl.
*E02F 9/20* (2006.01)
*B60W 30/188* (2012.01)
(Continued)

(52) U.S. Cl.
CPC ............ *E02F 9/2075* (2013.01); *B60W 20/15* (2016.01); *B60W 30/1886* (2013.01);
(Continued)

(58) Field of Classification Search
CPC ....... E02F 9/2075; E02F 9/123; E02F 9/2095; E02F 9/2217; E02F 9/2228; E02F 9/2282;
(Continued)

(56) References Cited

U.S. PATENT DOCUMENTS

2008/0317574 A1    12/2008  Moriya et al.
2013/0152573 A1*   6/2013   Tsuruga ................ E02F 9/2075
                                                           60/420
(Continued)

FOREIGN PATENT DOCUMENTS

EP    2 524 995 A1    11/2012
JP    2007056998 A     3/2007
(Continued)

OTHER PUBLICATIONS

International Preliminary Report on Patentability (PCT/IB/326 & PCT/IB/373) issued in PCT Application No. PCT/JP2013/084353, including English translation of Written Opinion (PCT/ISA/237) dated Jun. 30, 2016 (five (5) pages).

*Primary Examiner* — Richard Camby
(74) *Attorney, Agent, or Firm* — Crowell & Moring LLP

(57) ABSTRACT

A construction machine includes: a swing structure (20); hydraulic and electric motors (25) mechanically coupled to each other; a hydraulic pump (41) that supplies hydraulic fluid to the hydraulic motor; swing control lever (72) that instructs the swing structure to make a swing motion; and a control device (80) that controls at least either a delivery flow rate of the hydraulic pump or an output torque of the electric motor in such a manner that meter-out and meter-in pressures of the hydraulic motor that is run together with the electric motor approach each other when the demanded torque necessary for the swing motion of the swing structure instructed by the swing control lever can be produced by the electric motor alone.

5 Claims, 13 Drawing Sheets

(51) Int. Cl.
*E02F 9/12* (2006.01)
*E02F 9/22* (2006.01)
*F15B 15/08* (2006.01)
*E02F 3/32* (2006.01)

(52) U.S. Cl.
CPC ............ *E02F 9/123* (2013.01); *E02F 9/2095* (2013.01); *E02F 9/2217* (2013.01); *E02F 9/2228* (2013.01); *E02F 9/2235* (2013.01); *E02F 9/2282* (2013.01); *E02F 9/2285* (2013.01); *E02F 9/2296* (2013.01); *F15B 15/088* (2013.01); *B60W 2300/17* (2013.01); *B60W 2510/09* (2013.01); *B60W 2510/30* (2013.01); *B60W 2710/083* (2013.01); *B60W 2710/09* (2013.01); *B60Y 2200/412* (2013.01); *B60Y 2200/92* (2013.01); *B60Y 2400/306* (2013.01); *E02F 3/32* (2013.01); *F15B 2211/20546* (2013.01); *F15B 2211/6313* (2013.01); *F15B 2211/6336* (2013.01); *F15B 2211/6652* (2013.01); *F15B 2211/6654* (2013.01); *F15B 2211/6658* (2013.01); *F15B 2211/7058* (2013.01); *F15B 2211/76* (2013.01); *F15B 2211/88* (2013.01); *Y10S 903/93* (2013.01)

(58) Field of Classification Search
CPC ......... E02F 9/2285; E02F 9/2296; E02F 3/32; E02F 9/2235; F15B 15/088; F15B 2211/20546; F15B 221/6313; F15B 2211/6336; F15B 2211/6652; F15B 2211/6658; F15B 2211/7058; F15B 2211/76; F15B 2211/88; B60W 20/15; B60W 30/1886; B60W 2300/17; B60W 2510/09; B60W 2510/30; B60W 2710/083; B60W 2710/09; B60Y 2200/412; B60Y 2200/92; B60Y 2400/306

See application file for complete search history.

(56) References Cited

U.S. PATENT DOCUMENTS

2013/0180247 A1 7/2013 Yamada et al.
2013/0213026 A1 8/2013 Yamamoto et al.

FOREIGN PATENT DOCUMENTS

| JP | 2008063888 A | 3/2008 |
| JP | 2011144531 A | 7/2011 |
| JP | 2012041978 A | 3/2012 |
| JP | 2012062653 A | 3/2012 |

* cited by examiner

CONSTRUCTION MACHINE

TECHNICAL FIELD

The present invention relates to a construction machine having a swing structure, and more specifically, to a hybrid type construction machine having an electric motor and a hydraulic motor for driving the swing structure.

BACKGROUND ART

It has been in vogue for construction machines having a swing structure such as hydraulic excavators to use their engines to drive a hydraulic pump and run a hydraulic motor by a hydraulic pressure delivered from the hydraulic pump so as to drive its swing structure, an inertial structure. However, in recent years, there have been proposed a hybrid type construction machines proposed in terms of ensuring improved engine fuel economy, reduced noise level, and reduced exhaust gas. These construction machines use two kinds of motors to drive the swing structure, a hydraulic motor as has been already used and an electric motor driven by electric energy supplied from a power storage device.

In a hybrid type construction machine that drives its swing structure in a combined manner, it is necessary to control the drive torque shared by the hydraulic and electric motors such that operators accustomed to operating conventional construction machines (conventional machines) that drive their swing structures with a hydraulic motor alone can manipulate the hybrid type construction machine with no sense of discomfort.

JP-2008-63888-A discloses, as a control means of a hybrid type construction machine of the above kind, a technique for calculating a torque instruction value to be supplied to the electric motor that drives the swing structure based on the differential pressure between two ports provided on the hydraulic motor for driving the swing structure, the two port being a hydraulic fluid inlet (incoming side) and a hydraulic fluid outlet (outgoing side). Here, the torque ratios between the hydraulic and electric motors at the time of acceleration of the swing and at the time of deceleration of the swing are defined by the differential pressure between the incoming and outgoing sides of the hydraulic motor as a parameter. This technique allows for successive and smooth driving and control of the swing structure, an inertial structure, and also permits efficient capture of braking energy into a power storage device as electric energy.

PRIOR ART DOCUMENT

Patent Document

Patent document 1: JP-2008-63888-A

SUMMARY OF THE INVENTION

Problem to be Solved by the Invention

Incidentally, losses of the hydraulic and electric motors vary independently in accordance with the operation amount of the swing control lever or the swing speed of the swing structure. However, the technique described in the above document determines the ratio of the electric motor torque to the total torque used to drive the swing structure by the differential pressure between the incoming and outgoing sides of the hydraulic motor regardless of the operation amount of the swing control lever (swing pilot pressure). Therefore, losses of various parts caused by the driving of the hydraulic and electric motors are not considered, leaving room for improvement of the energy efficiency.

The present invention has been devised in light of the foregoing, and it is an object of the present invention to provide a construction machine that offers operability comparable to that of a conventional construction machine designed to drive the swing structure with a hydraulic motor alone and, at the same time, ensures improved energy efficiency of the system as a whole during driving of the swing structure.

Means for Solving the Problem

The present invention includes a plurality of means for achieving the above object. One example among them is a construction machine that includes a swing structure, a hydraulic motor, an electric motor, a hydraulic pump, an operating device, and a control device. Both the hydraulic and electric motors drive the swing structure and are mechanically coupled. The hydraulic pump is driven by a prime mover and supplies hydraulic fluid to the hydraulic motor. The operating device instructs the swing structure to make a swing motion. When the demanded torque necessary for the swing motion of the swing structure instructed by the operating device can be produced by the electric motor alone, the control device controls at least either a delivery rate of the hydraulic pump or an output torque of the electric motor such that meter-out and meter-in pressures of the hydraulic motor that is run together with the electric motor approach each other, or such that the meter-out pressure is larger than the meter-in pressure.

Effect of the Invention

The present invention ensures reduced loss of a hydraulic motor run together with an electric motor when the electric motor is mainly used to drive a swing structure, thus contributing to significantly reduced fuel consumption owing to improved energy efficiency during swing of the swing structure.

Figure 9:
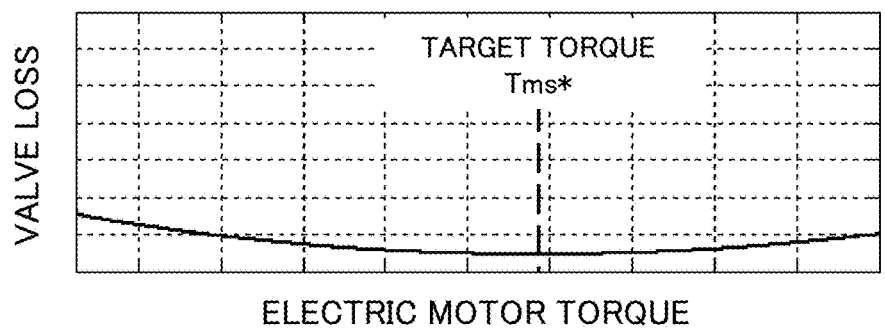

FIG. 9 is a relational diagram between a torque of the swing electric motor 25 and a loss of the hydraulic parts when the electric motor torque is increased.

Figure 10:
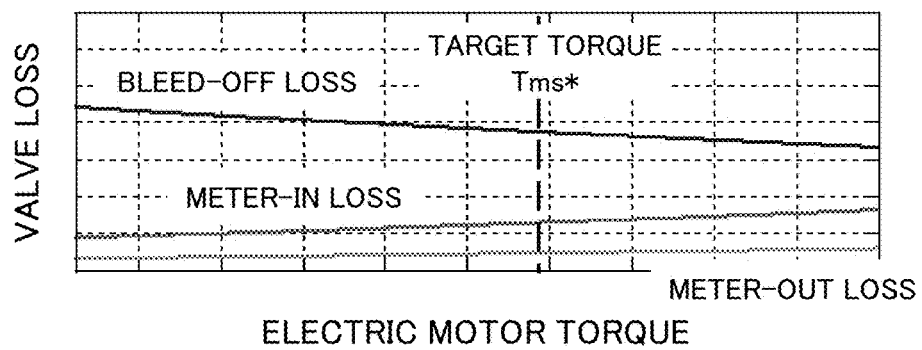

FIG. 10 is a diagram illustrating a breakdown of valve loss into bleed-off loss, meter-in loss, and meter-out loss.

Figure 11:
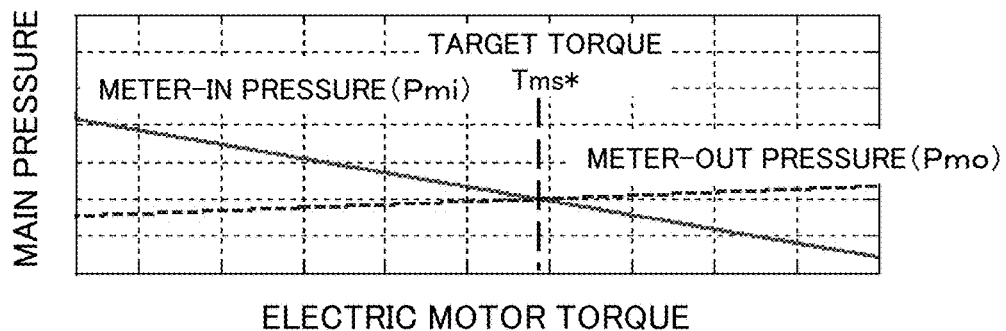

FIG. 11 is a relational diagram between an electric motor torque and a main swing pressure at cases where FIG. 9 and FIG. 10. depict.

Figure 12:
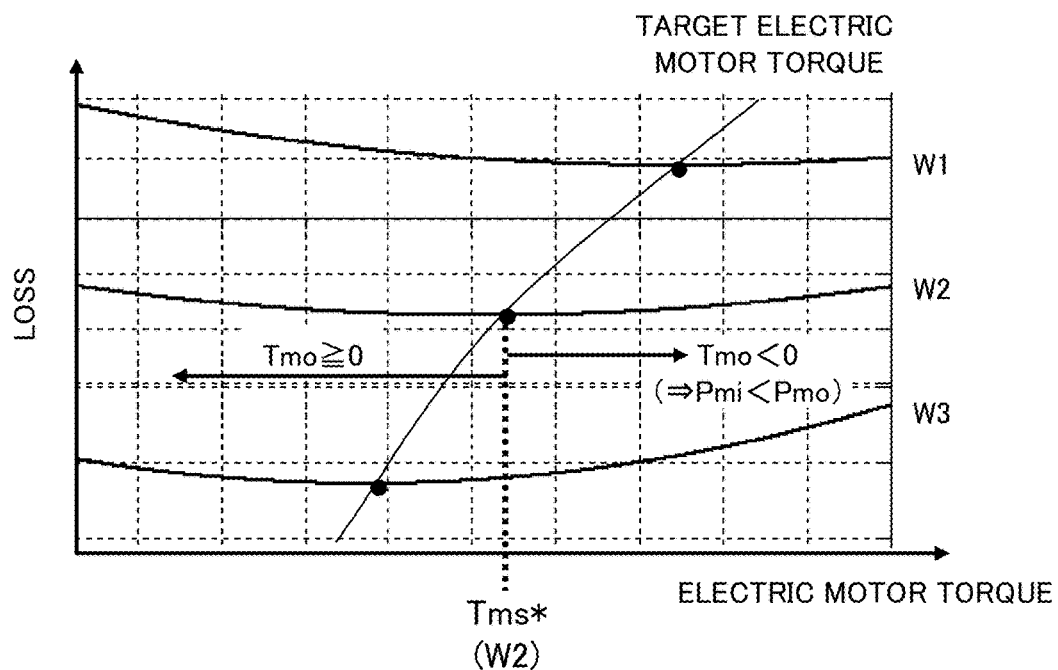

FIG. 12 is a relational diagram illustrating, for each revolution speed of the swing electric motor 25, a relationship between the torque of the swing electric motor 25 and a loss of the hydraulic parts when the electric motor torque is increased.

Figure 13:
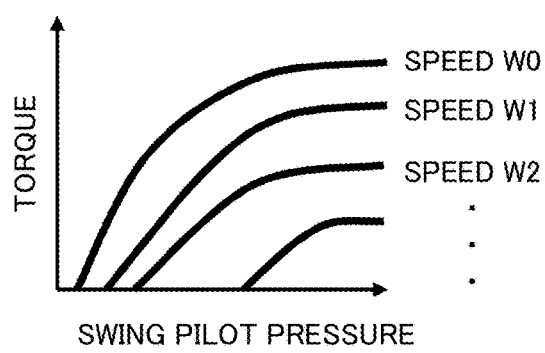

FIG. 13 is a diagram illustrating, for each swing speed, a relationship between a target torque Tms* of the swing electric motor 25 and a swing pilot pressure.

Figure 14:
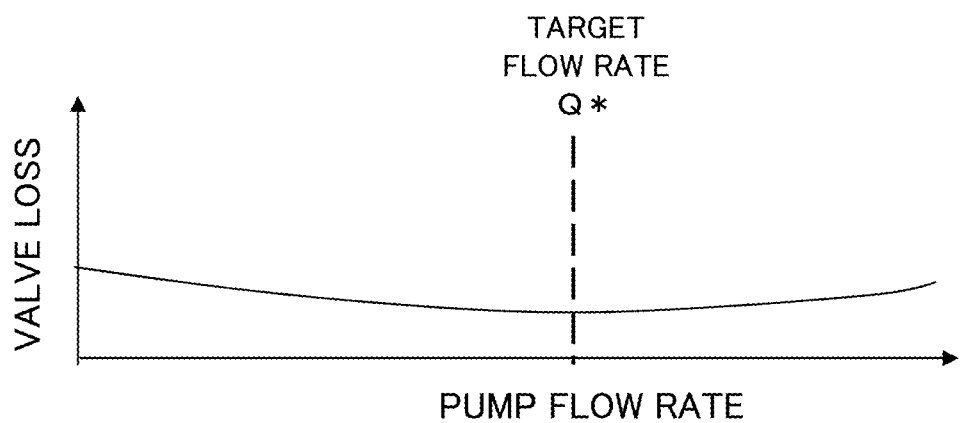

FIG. 14 is a relational diagram between a pump flow rate of a hydraulic pump 41 and a loss of the hydraulic parts when the flow rate is increased.

Figure 15:
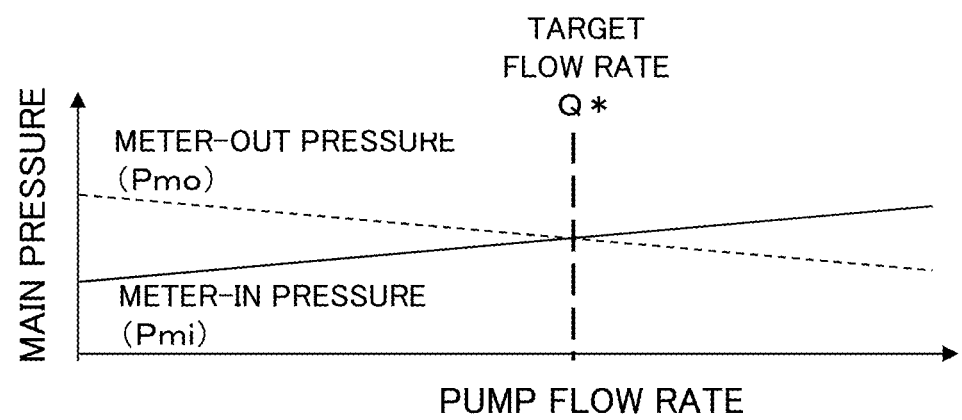

FIG. 15 is a relational diagram between the pump flow rate and the main swing pressure in the case of FIG. 14.

Figure 16:
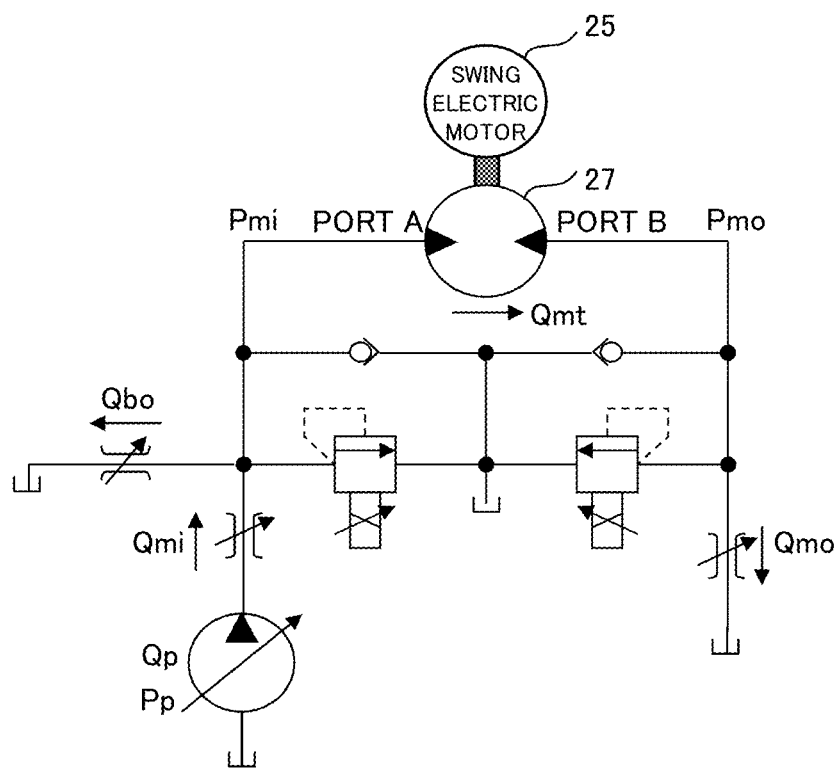

FIG. 16 is a simplified diagram of a hydraulic circuit according to the swing hydraulic motor 27 in the present embodiment.

Figure 17:
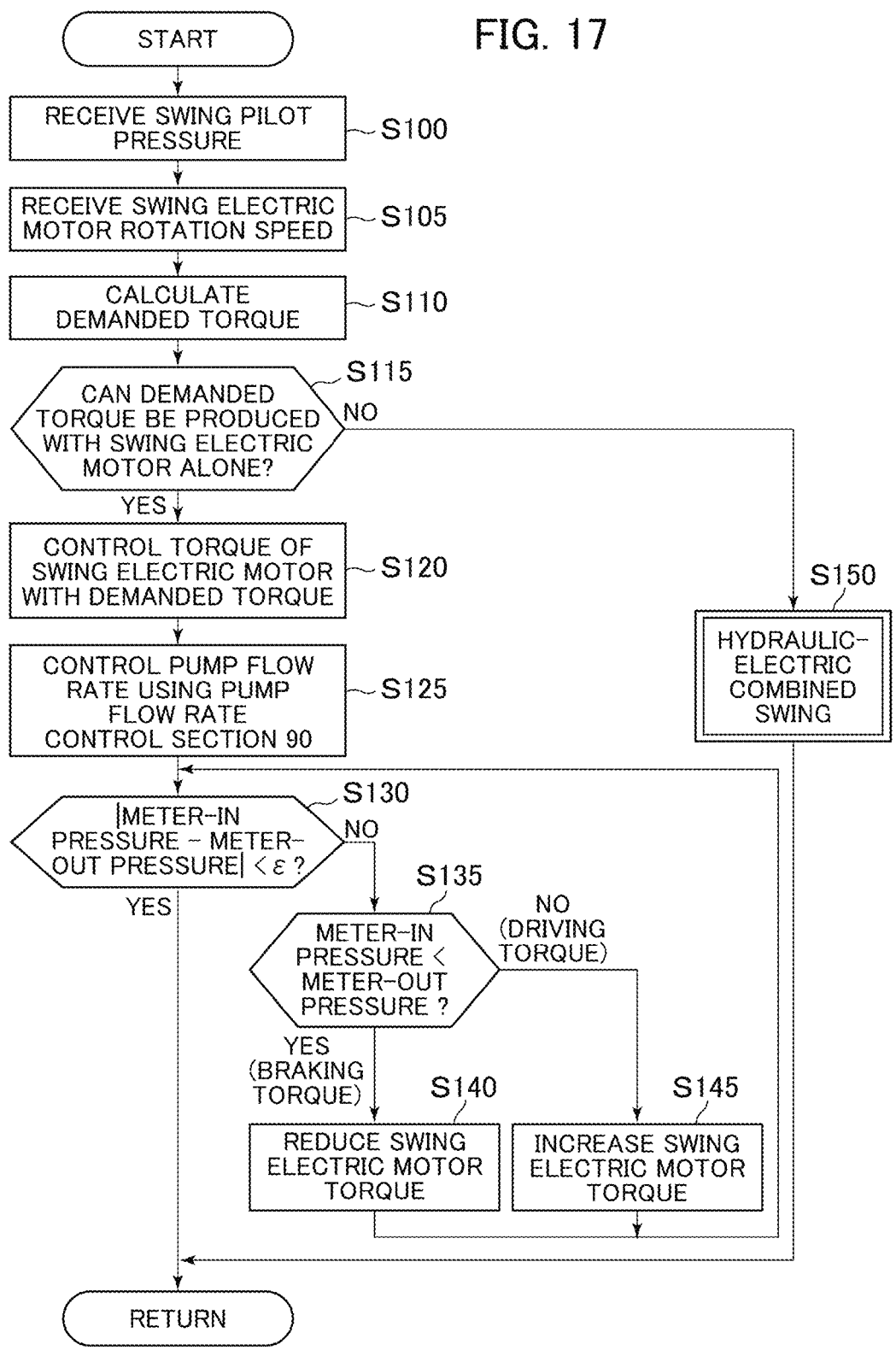

FIG. 17 is a flowchart for creating a condition where meter-in and meter-out pressures of the swing hydraulic motor 27 are equal to each other by controlling the torque of the swing electric motor 25 with the flow rate of the hydraulic pump 41 maintained at a predetermined value.

Figure 18:
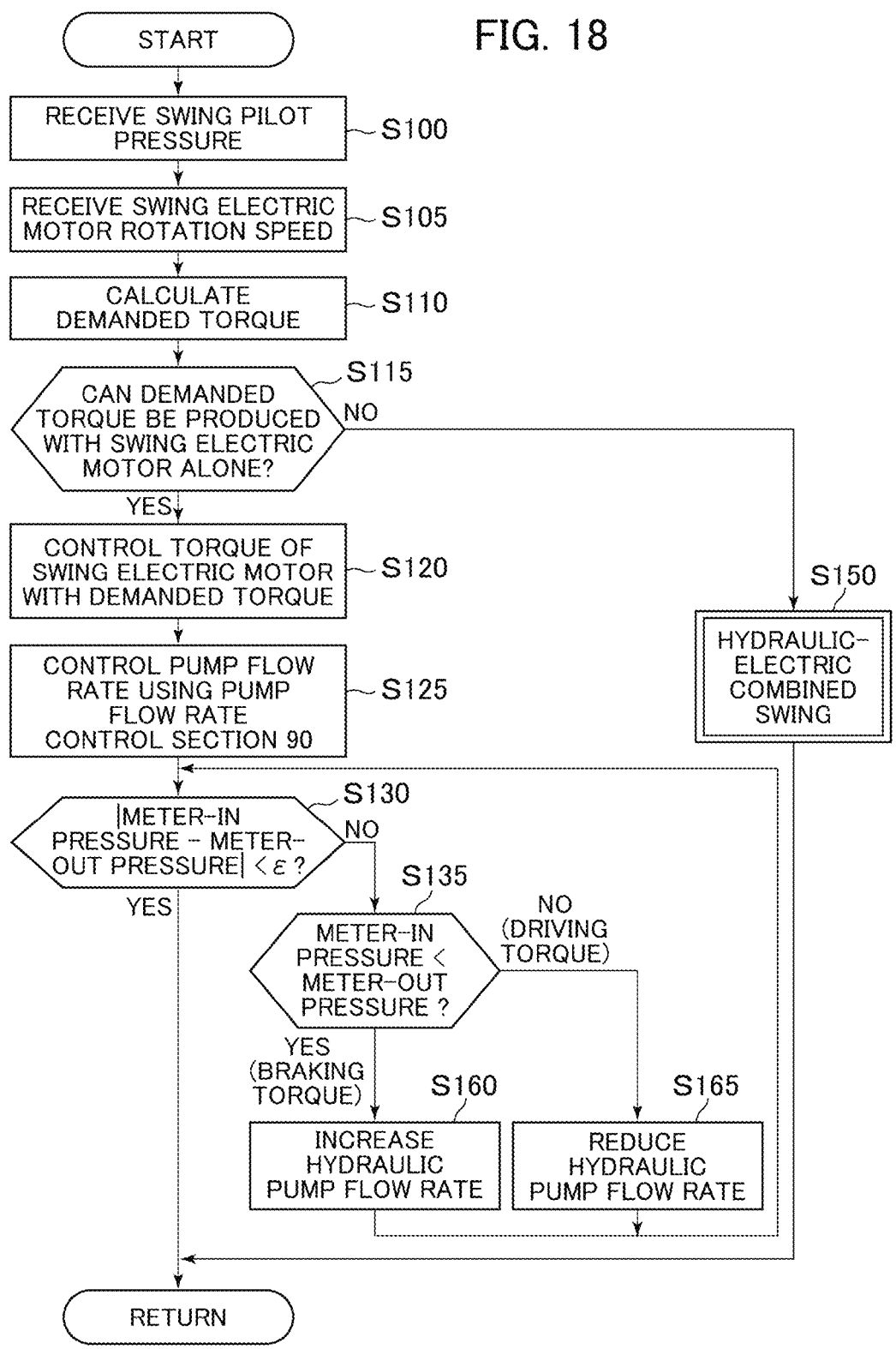

FIG. 18 is a flowchart for creating a condition where the meter-in and meter-out pressures of the swing hydraulic motor 27 are equal to each other by controlling the flow rate of the hydraulic pump 41 with the torque of the swing electric motor 25 maintained at a predetermined value.

Figure 19:
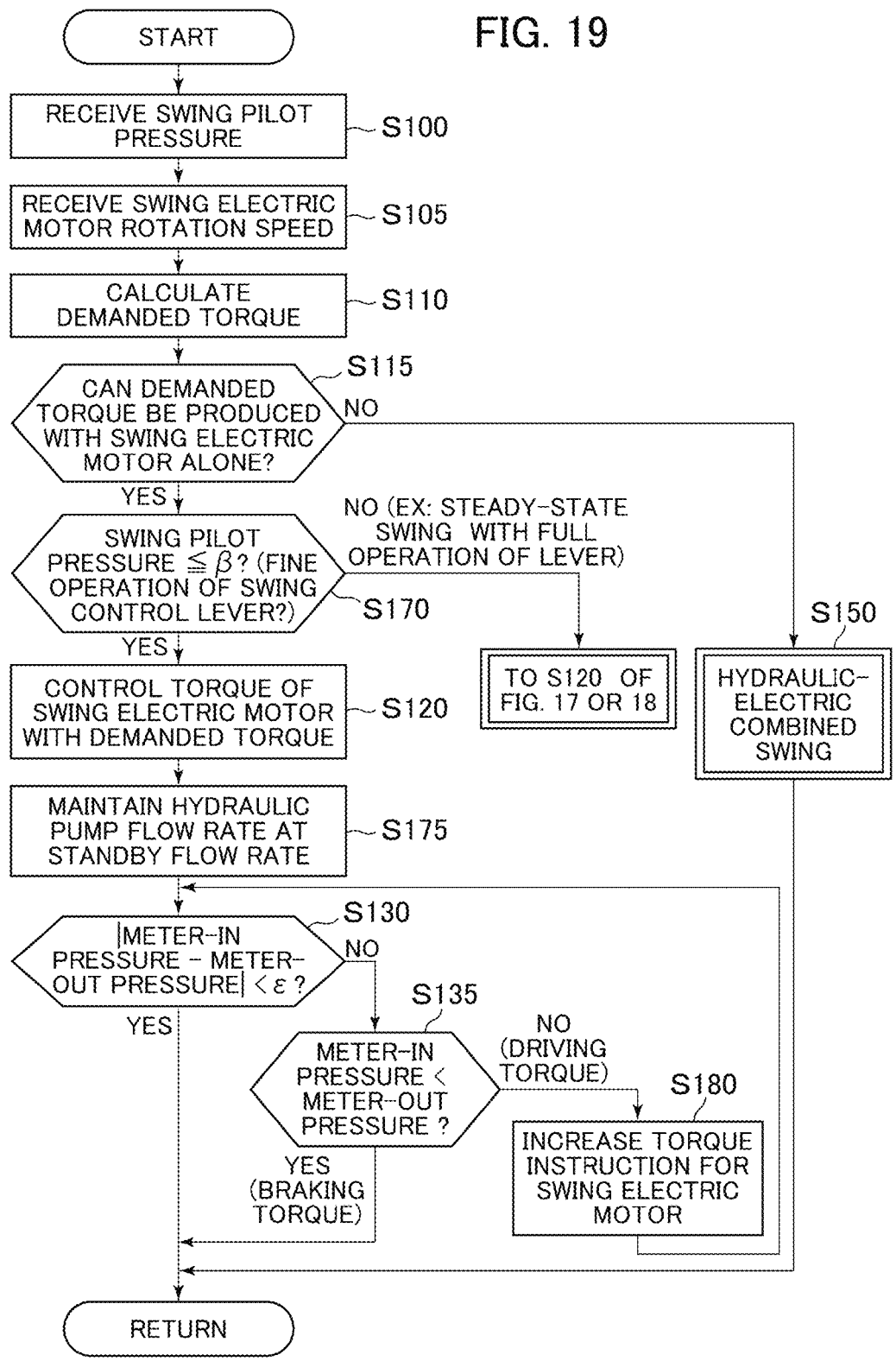

FIG. 19 is a flowchart for controlling the torque of the swing electric motor 25 while maintaining the flow rate of the hydraulic pump 41 at a standby flow rate.

MODES FOR CARRYING OUT THE INVENTION

A description will be given first of main features of a construction machine according to each embodiment of the present invention before describing the respective embodiments of the present invention.

(1) A construction machine according to the embodiments of the present invention described later includes a swing structure, a hydraulic motor, an electric motor, a hydraulic pump, an operating device, and a control device. Both the hydraulic and electric motors drive the swing structure and are mechanically coupled. The hydraulic pump is driven by a prime mover and supplies hydraulic fluid to the hydraulic motor. The operating device instructs the swing structure to make a swing motion. The control device controls at least either a delivery rate of the hydraulic pump (may be abbreviated as a "pump flow rate" or "flow rate" in the present specification) or an output torque of the electric motor (may be abbreviated as an "output torque" or "torque" in the present specification) in such a manner that meter-out and meter-in pressures of the hydraulic motor that is run together with the electric motor approach each other or that the meter-out pressure is larger than the meter-in pressure when the demanded torque necessary for the swing motion of the swing structure instructed by the operating device can be produced by the electric motor alone.

The inventor et al. have found that if the demanded torque is small to such an extent that the torque can be produced by the electric motor alone (e.g., a case where the swing structure is accelerating at low speed or a case where the rotation speed of the swing structure is constant (during steady-state swing)), and if all or almost all of the demanded torque is produced by the electric motor, loss of a hydraulic system that drives the hydraulic motor (sum of bleed-off loss, meter-in loss, and meter-out loss of the hydraulic motor) is minimal when meter-out and meter-in pressures of the hydraulic motor that is run together with the electric motor match. Further, they have found that if the demanded torque is small to such an extent that the torque can be produced by the electric motor alone, it is more efficient that the swing structure be drive by the electric motor alone without using the hydraulic motor. For this reason, the construction machine configured as described above minimizes loss of the hydraulic motor run together with the electric motor when all or almost all of the demanded torque is produced by the electric motor, thus contributing to significantly reduced fuel consumption owing to improved energy efficiency during swing of the swing structure.

On the other hand, it is not essential that the meter-out and meter-in pressures of the hydraulic motor match. The inventor et al. have found that if it is difficult to achieve a match between the meter-out and meter-in pressures of the hydraulic motor, there is a case where the energy efficiency of the system as a whole is improved compared with a case where the swing structure is driven by the hydraulic motor alone even when the meter-out pressure is larger than the meter-in pressure (e.g., even if no powering torque is produced by the hydraulic motor). That is, if the meter-out pressure of the hydraulic motor is larger than the meter-in pressure, the hydraulic motor acts as a load of the electric motor by producing a braking torque. Nevertheless, there is a case where the energy efficiency of the system as a whole is higher than when the swing structure is driven by the hydraulic motor alone depending on the delivery rate of the hydraulic pump. Therefore, fuel consumption can be reduced even when the hydraulic motor produces a braking torque.

A specific example of a flow rate of the hydraulic pump that provides improved energy efficiency despite a braking torque produced by the hydraulic motor is a standby flow rate. The reason for this is that loss of the hydraulic system can be significantly reduced by bringing the pump flow rate down to the standby flow rate. It should be noted that the term "standby flow rate" in the present specification refers to a flow rate set as a flow rate of the hydraulic pump when all operating devices (control levers) for instructing the driving of hydraulic actuators mounted to the construction machine are in their neutral positions. In terms of ensuring improved efficiency of the hydraulic system, it is preferred that the minimum flow rate of the hydraulic pump that allows for the construction machine to be maintained operational be set to the standby flow rate when all the operating devices are in their neutral positions.

It should be noted that there are specific examples of a "case where the demanded torque is small to such an extent that the torque can be produced by the electric motor alone," namely, when the swing structure is accelerating at low speed as a result of fine operation of the operating device (during acceleration at low speed) and when the rotation speed of the swing structure is constant regardless of the operation amount of the operating device (during steady-state swing). The term "fine operation" here refers to a region of operation amount where a swing operation pressure (swing pilot pressure) output from the operating device when an instruction is issued to the swing structure to swing is equal to or less than a reference value. It is preferred that the efficiency achieved by swinging the swing structure with the electric motor alone be compared against that achieved by swinging the swing structure with the electric and hydraulic motors, and that the value that provides higher efficiency for the former be chosen as appropriate as the reference value. An approximate guide of the reference value is a swing pilot pressure of 1.5 MPa or so.

(2) In feature (1) described above, it is preferred that the demanded torque be determined based on the operation amount of the operating device (swing pilot pressure) and the revolution speed (swing speed) of the swing structure. More specifically, the demanded torque is set such that the larger the operation amount of the operating device, the larger the demanded torque, and further, the smaller the revolution speed of the swing structure, the larger the demanded torque. It should be noted that, in the case of feature (1), all or almost all of the demanded torque is produced by the electric motor. Therefore, the demanded torque is synonymous with the torque of the electric motor.

Among specific examples of controlling the electric and hydraulic motors in features (1) and (2) are features (3) and (4) described below.

(3) In feature (1) or (2), when the swing structure is accelerating in a fine operation region where the operation amount of the operating device is equal to or less than the reference value (during acceleration at low speed), or when the rotation speed of the swing structure is constant regardless of the operation amount of the operating device (during steady-state swing), it is preferred that the control device maintain the delivery rate of the hydraulic pump at a predetermined target value, and moreover, control the output torque of the electric motor such that the meter-out and meter-in pressures approach each other, or that the meter-out pressure is larger than the meter-in pressure.

That is, in this case, the meter-out and meter-in pressures are adjusted by controlling the torque of the electric motor while maintaining the flow rate of the hydraulic pump at a target value. In this case, the electric motor torque is controlled. This provides, as an advantage, better responsiveness than in feature (4) described later that controls the hydraulic motor. Further, if the hydraulic pump supplies hydraulic fluid to other hydraulic actuators in addition to the hydraulic motor, controlling the hydraulic motor as in feature (4) may affect control of the other actuators. However, controlling the electric motor as described earlier makes it less likely, as an advantage, that control of the other hydraulic actuators may be affected by the control of the invention.

(4) In feature (1) or (2), when the swing structure is accelerating in a fine operation region where the operation amount of the operating device is equal to or less than the reference value, or when the rotation speed of the swing structure is constant regardless of the operation amount of the operating device, it is preferred that the control device maintain the torque of the electric motor at a predetermined target value that is determined based on the operation amount of the operating device and the revolution speed of the swing structure, and moreover, control the delivery rate of the hydraulic motor such that the meter-out and meter-in pressures approach each other, or that the meter-out pressure is larger than the meter-in pressure.

That is, in this case, the meter-in and meter-out pressures are adjusted by controlling the flow rate of the hydraulic pump while maintaining the torque of the electric motor at a target value. In this case, the flow rate of the hydraulic pump (pump output) is controlled. This ensures direct reduction in loss associated with the hydraulic system, thus offering, as an advantage, larger reduction in engine fuel consumption than in feature (3). Further, the present control is also applicable when power supply to the electric motor is restricted, thus offering, as an advantage, improved energy efficiency.

It should be noted that, in both features (3) and (4), controlling the electric and hydraulic motors such that the meter-out and meter-in pressures match contributes the most to improved system efficiency as described earlier.

(5) In feature (3), when the swing structure is accelerating with the operation amount of the operating device falling within the fine operation region, it is preferred that the control device maintain the delivery rate of the hydraulic pump at the standby flow rate, and moreover, control the output torque of the electric motor such that the meter-out and meter-in pressures approach each other, or that the meter-out pressure is larger than the meter-in pressure.

"When the swing structure is accelerating with the operation amount of the operating device falling within the fine operation region," this means that the hydraulic excavator starts to swing its swing structure from a non-operational state (e.g., state where all the operating devices of the hydraulic excavator are in their neutral positions). Therefore, it is important to minimize loss of the hydraulic system by maintaining the flow rate of the hydraulic pump at the standby flow rate for improved system efficiency. In this case, the flow rate of the hydraulic pump cannot be reduced to less than the standby flow rate. Therefore, control of the electric and hydraulic motors is significantly restricted as compared to the above features (3) and (4). Also in this case, however, the system efficiency can be improved by controlling the electric motor torque such that the meter-out pressure is larger than the meter-in pressure as described above.

It should be noted that if the flow rate of the hydraulic pump and the torque of the electric motor are controlled based on the meter-out and meter-in pressures as in features (1) to (5), so-called feedback control may be used that controls the flow rate of the hydraulic pump and the torque of the electric motor based on the sensor-detected values of the meter-out and meter-in pressures of the hydraulic motor.

Alternatively, the flow rate of the hydraulic pump and the torque of the electric motor may be set in advance such that the above relationship between the meter-out and meter-in pressures holds in accordance with the magnitude of the demanded torque (e.g., a relationship between the demanded torque, the hydraulic pump flow rate, and the electric motor torque may be stored in the form of a table), followed by controlling the flow rate of the hydraulic pump and the torque of the electric motor based on the setting values.

Still alternatively, after using the latter control first, the former control may be additionally used based on the sensor-detected values of the meter-out and meter-in pressures of the hydraulic motor, thus allowing the former control (feedback control) to compensate for the latter control. Such use of the latter control in combination with the former control provides significantly improved responsiveness and accuracy in control according to the present invention.

A specific description will be given below of embodiments of the present invention by taking, as an example, a hydraulic excavator, as a construction machine. It should be noted that the present invention is applicable to all kinds of work and construction machines having a swing structure, and that the application thereof is not limited to hydraulic excavators.

Figure 1:
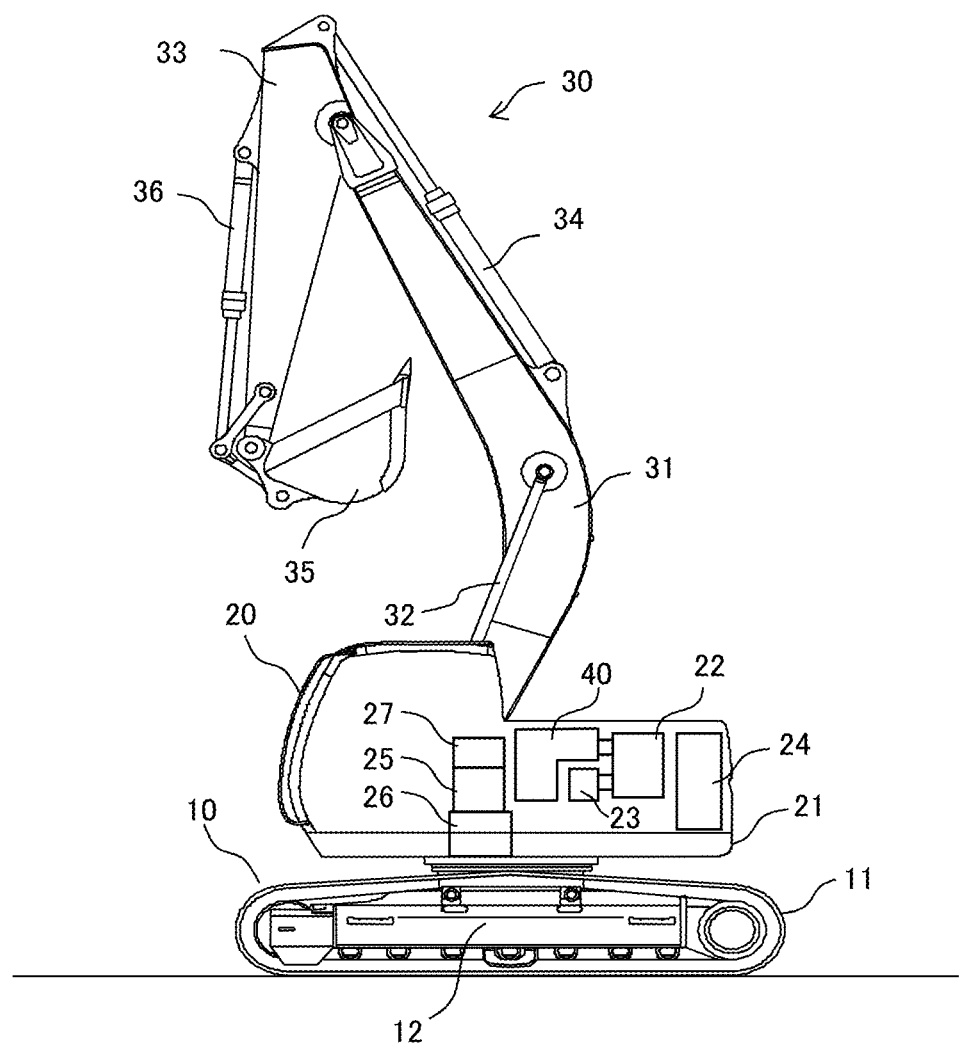
FIG. 1 is a side view of a hydraulic excavator according to an embodiment of the present invention.
Figure 2:
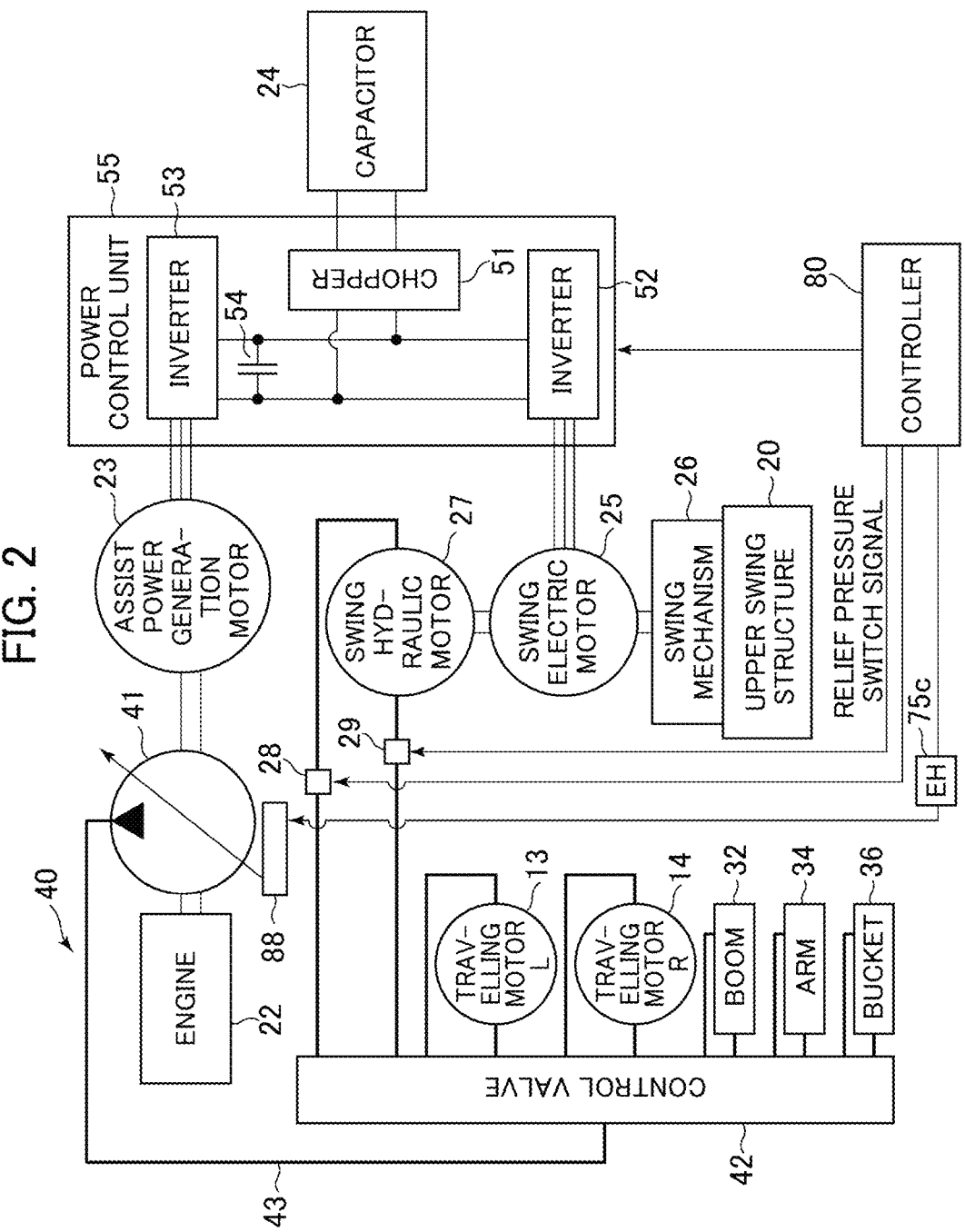
FIG. 2 is a system configuration diagram of electric and hydraulic systems mounted to the hydraulic excavator shown in FIG. 1.
Figure 3:
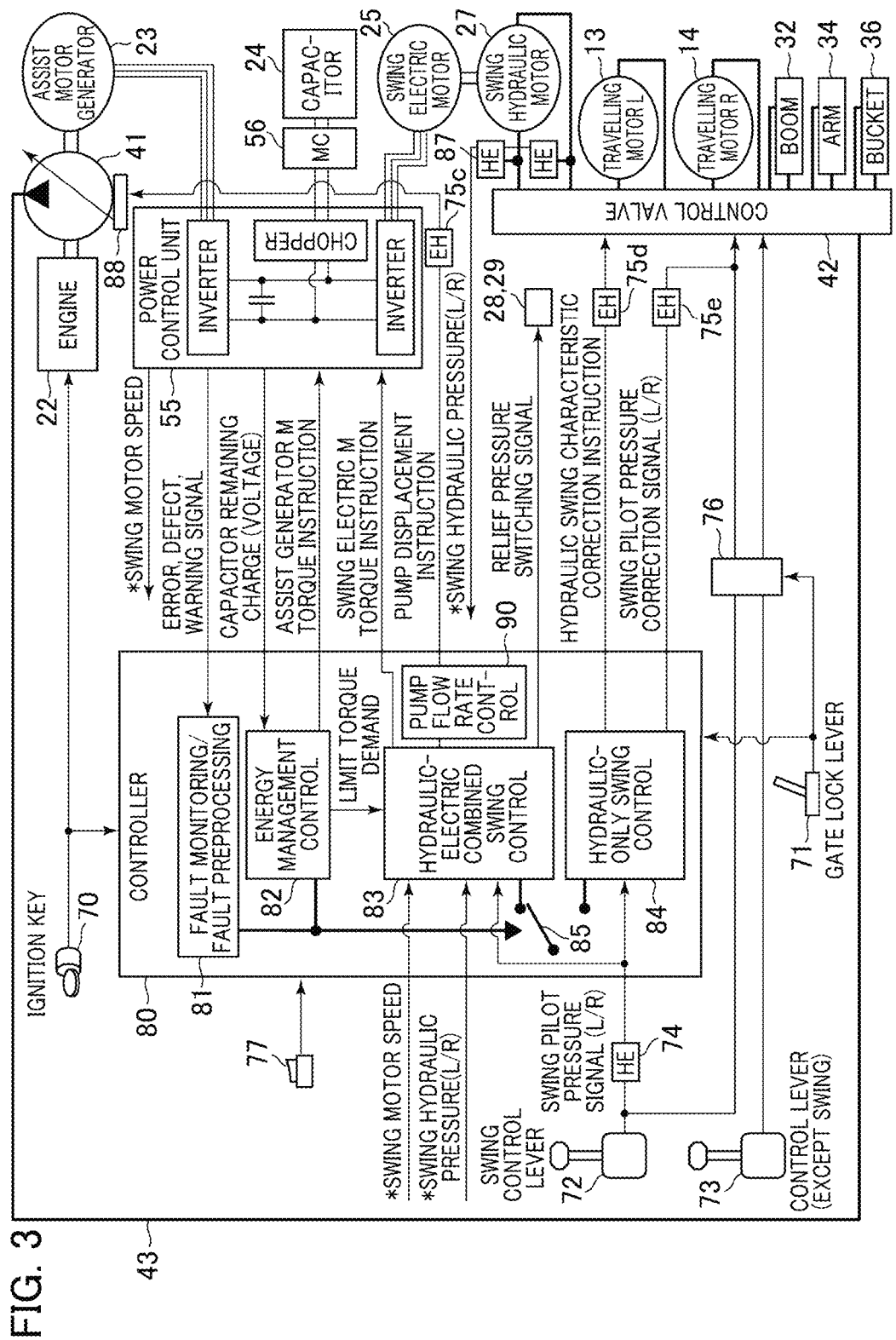
FIG. 3 is a detailed diagram of the system configuration diagram shown in FIG. 2.

FIG. 1 is a side view of a hydraulic excavator according to an embodiment of the present invention. FIG. 2 is a system configuration diagram of electric and hydraulic systems mounted to the hydraulic excavator shown in FIG. 1. FIG. 3 is a detailed diagram of the system configuration diagram shown in FIG. 2. It should be noted that the same components may be denoted by the same reference numerals, and that the description thereof is omitted in these and following figures.

As illustrated in FIG. 1, the hydraulic excavator in the present example includes a lower track structure 10, an upper swing structure 20, and an excavator mechanism (front work implement) 30. The upper swing structure 20 is swingably attached to the upper area of the lower track structure 10. The excavator mechanism 30 (front work device) has a multi-joint link mechanism whose one end is coupled to the upper swing structure 20.

The lower track structure 10 includes a pair of left and right crawlers 11 and crawler frames 12 (only one each is shown in FIG. 1). The crawlers 11 are driven independently by a pair of travelling hydraulic motors 13 and 14 shown in FIG. 2, respectively, via an unshown speed reducing mechanism.

The upper swing structure 20 has a swing frame 21 swingably attached to the lower track structure 10. An engine 22, an assist generator motor 23, a swing electric motor 25, a capacitor 24, and a swing hydraulic motor 27, are mounted to the swing frame 21. The assist generator motor 23 is driven by the engine 22. The capacitor 24 is a power storage device that is connected to the assist generator motor 23 and the swing electric motor 25. Further, a hydraulic system 40 and a swing control system illustrated in FIG. 2 are mounted to the swing frame 21. The hydraulic system 40 includes a hydraulic pump 41 and a control valve 42. The swing control system includes a power control unit 55 and a controller 80.

The swing frame 21 includes a speed reduction mechanism that reduces the rotation speed of the swing electric motor 25. The swing frame 21 is swingably attached to the upper area of the lower track structure 10 via a swing mechanism 26 that is driven by driving force of the swing electric motor 25 and the swing hydraulic motor 27.

It should be noted that although, in the present embodiment, the capacitor 24 is used as a power storage device, a storage battery may be used instead. Alternatively, both a capacitor and a storage battery may be used together. Still alternatively, power may be supplied from an external power source that is connected by a cable rather than using a power storage device.

The excavator mechanism 30 includes a boom 31, a boom cylinder 32, an arm 33, an arm cylinder 34, a bucket 35, and a bucket cylinder 36. The boom cylinder 32 drives the boom 31. The arm 33 is pivotally supported in a rotatable manner near the tip area of the boom 31. The arm cylinder 34 drives the arm 33. The bucket 35 is pivotally and rotatably supported at the tip of the arm 33. The bucket cylinder 36 drives the bucket 35. The base end area of the boom 31 is rotatably supported by the swing frame 21. The boom 31, the arm 33, and the bucket 35, are each rotated about a coupling axis, thus allowing the hydraulic excavator to proceed with excavation or other construction work.

The hydraulic system 40 illustrated in FIG. 1 includes, as illustrated in FIG. 2, the engine 22, the hydraulic pump 41, a plurality of actuators (travelling hydraulic motors 13 and 14, swing hydraulic motor 27, boom cylinder 32, arm cylinder 34, and bucket cylinder 36), and the control valve 42. The hydraulic pump 41 is driven by the engine 22. The hydraulic actuators are driven by hydraulic fluid delivered from the hydraulic pump 41 via a hydraulic pipe 43. The control valve 42 changes the amount of hydraulic fluid supplied to each of these actuators and the direction of supply in accordance with instructions issued from control levers 72 and 73 (refer to FIG. 3).

The hydraulic pump 41 is a variable displacement pump whose displacement volume is changed by changing its tilting angle with a regulator 88 (pump displacement volume adjustment device). Change in the pump displacement volume changes the output and/or flow rate of the pump. The regulator 88 is controlled by a hydraulic signal, thus controlling the displacement volume of the hydraulic pump 41. The hydraulic signal is converted by an electric-hydraulic signal converter 75c from an electric signal supplied from the controller 80.

It should be noted that the control valve 42 according to the present embodiment ensures that the meter-out opening area when the operation amount of the swing control lever 72 (refer to FIG. 3) is in an intermediate region is larger than in ordinary excavators (those that swing and drive their upper swing structures with a hydraulic motor alone), and that the braking torque of the swing hydraulic motor 27 when the operation amount is in an intermediate region (torque in the direction of braking the upper swing structure 20) is smaller than in ordinary excavators.

As a swing control system, the controller 80 is provided as illustrated in FIG. 3. The controller 80 outputs a control signal (operation signal), a signal appropriate to an instruction from the swing control lever 72, to the control valve 42 and the power control unit 55. The power control unit 55 controls charging and discharging of the capacitor 24.

The hydraulic excavator illustrated in FIG. 1 includes, in FIG. 3, an ignition key 70 and a gate lock lever device 71. The ignition key 70 is used to start the engine 22. The gate lock lever device 71 switches ON a pilot pressure shutoff valve 76 when work is suspended to disable the activation of the hydraulic system.

The power control unit 55 controls supply of power from the capacitor 24 to the swing electric motor 25 and charging of the capacitor 24 with AC power recovered from the swing electric motor 25. The power control unit 55 includes a chopper 51, inverters 52 and 53, and a smoothing capacitor 54. The chopper 51 steps up the DC voltage supplied from the capacitor 24 to a predetermined bus voltage. The inverter 52 drives the swing electric motor 25. The inverter 53 drives the assist generator motor 23. The smoothing capacitor 54 is provided to stabilize the bus voltage. It should be noted that reference numeral 56 in FIG. 3 represents a main contact and that the main contact 56 includes a main relay and a rush current prevention circuit.

The rotating shafts of the swing electric motor 25 and the swing hydraulic motor 27 are mechanically coupled, and the upper swing structure 20 is driven by total torque produced by these motors. The capacitor 24 is charged or discharged in accordance with the driving state of the assist generator motor 23 and the swing electric motor 25 (whether these motors are powering or regenerating).

Figure 4:
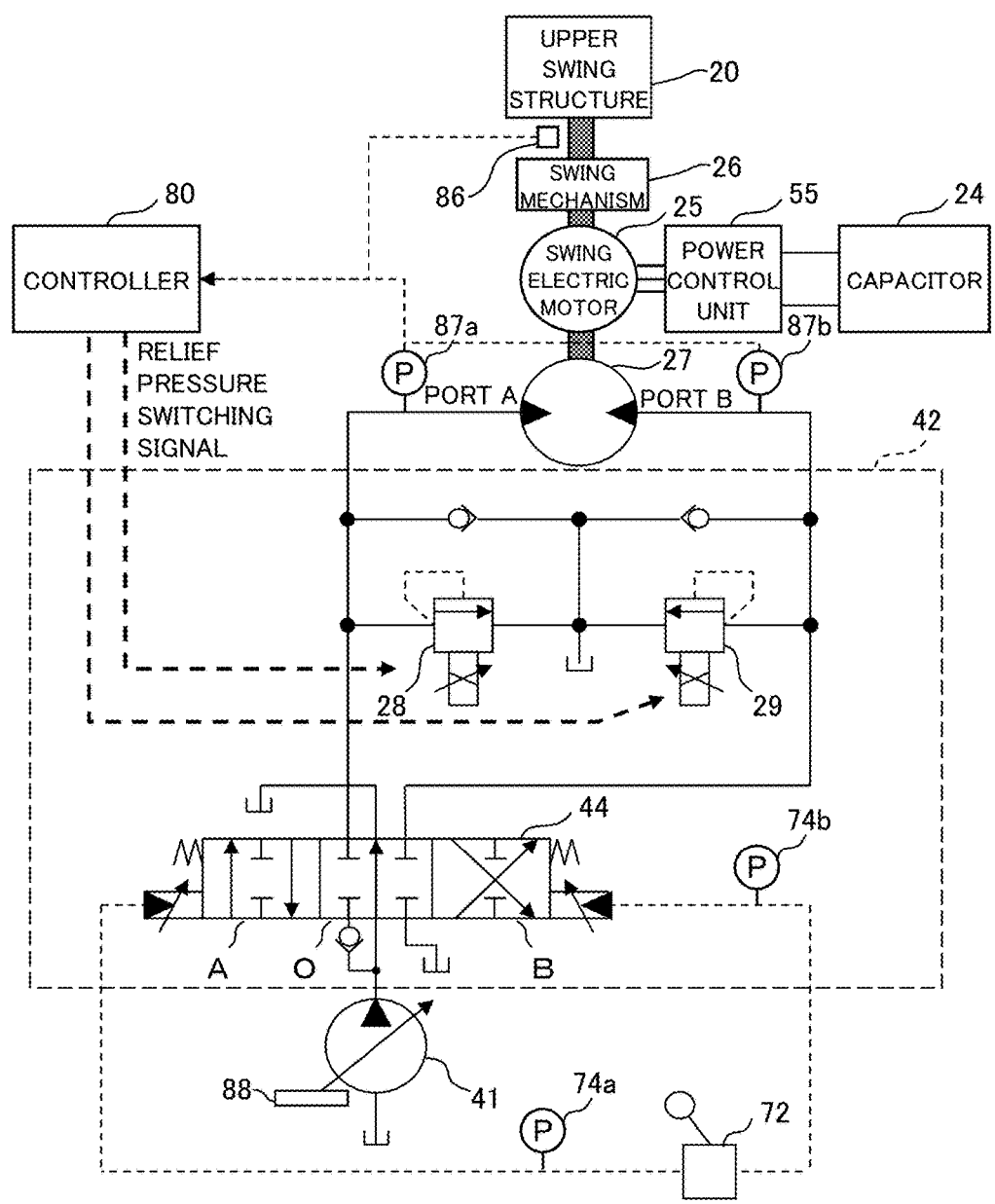
FIG. 4 is a diagram illustrating a hydraulic system extracted from the system configuration diagrams of FIGS. 2 and 3 that is involved in swing motion of an upper swing structure.

FIG. 4 is a diagram illustrating the hydraulic system extracted from the system configuration diagrams of FIGS. 2 and 3 that is involved in swing motion of the upper swing structure. In FIG. 4, hydraulic fluid delivered from the hydraulic pump 41 is introduced into the swing hydraulic motor 27 via a swing spool 44 whose position is changed based on a swing control lever signal (swing pilot pressure) output from the swing control lever 72. It should be noted that the swing spool 44 is one of a plurality of spools included in the control valve 42 (refer to FIGS. 2 and 3).

The swing control lever 72 is used by an operator to control the swing motion of the upper swing structure 20. A hydraulic signal (operation signal) generated in accordance with the operation amount and direction of operation of the swing control lever 72 is output to one of two pressure chambers of the swing spool 44. The swing control lever 72 can be operated in two directions that are associated with the swing directions of the upper swing structure 20. The swing pilot pressure proportional to the operation amount acts on the pressure chamber of the swing spool 44. The direction of operation and operation amount of the swing control lever 72 (swing pilot pressure) can be detected by pressure sensors 74a and 74b attached to a line that is used to cause hydraulic fluid, supplied from the swing control lever 72, to act on the swing spool 44. The pressures detected by pressure sensors 89a and 89b are output to the controller 80. It should be noted that the pressure sensors 74a and 74b correspond to a hydraulic-electric signal converter 74 illustrated in FIG. 3.

The swing hydraulic motor 27 has two ports (ports A and B) serving as an inlet and an outlet of hydraulic fluid. In the present specification, the port that serves as an inlet of hydraulic fluid during leftward swing is defined as port A, and the port that serves as an outlet as port B, and the port that serves as an inlet of hydraulic fluid during rightward swing is defined as port B, and the port that serves as an outlet as port A.

In FIG. 4, a port A side relief valve 28 is attached to the port A side, and a port B side relief valve 29 is attached to the port B side. The port A side relief valve 28 opens when the port A side pressure reaches a relief pressure. The port B side relief valve 29 opens when the port B side pressure reaches a relief pressure. The port A side relief valve 28 and the port B side relief valve 29 are electromagnetic variable relief valves, controlling port A and B pressures of the swing hydraulic motor 27 respectively. The relief pressures of the port A and B side relief valves 28 and 29 can be changed based on a relief pressure switching signal supplied from the controller 80.

Further, a pressure sensor 87a is attached to port A to detect the port A pressure, and a pressure sensor 87b to port B to detect the port B pressure. The outputs of the two pressure sensors 87a and 87b are supplied to the controller 80. It should be noted that when collectively shown in the description given below, the two pressure sensors 87a and 87b may be denoted as "the pressure sensors 87" with no subscript.

The changeover amount in position of the swing spool 44 (spool stroke) is controlled in accordance with the operation pressure that is output from the swing control lever 72 to act on the pressure chamber. The operation pressure successively changes the position of the swing spool 44 from a neutral position O to position A or B in FIG. 4. When the position of the swing spool 44 changes, the flow rate of hydraulic fluid supplied to the swing hydraulic motor 27 from the hydraulic pump 41 via the swing spool 44 is controlled.

For example, if the swing control lever 72 is in a neutral position, and when the swing spool 44 is in the neutral position O, hydraulic fluid delivered from the hydraulic pump 41 returns to the tank through a bleed-off restrictor.

On the other hand, for example, if the swing control lever 72 is operated such that the swing structure swings to the left, the swing spool 44 switches to position A, thus reducing the opening area of the bleed-off restrictor and increasing the opening areas of the meter-in and meter-out restrictors.

Hydraulic fluid delivered from the hydraulic pump 41 is sent to port A of the swing hydraulic motor 27 through the meter-in restrictor of position A. Hydraulic fluid returning from the swing hydraulic motor 27 returns to the tank through the meter-out restrictor of position A. Such regulation of hydraulic fluid causes the swing hydraulic motor 27 to turn counterclockwise. Further, in this case, hydraulic fluid flows from port A to port B. Therefore, the pressure detected by the pressure sensor 87a is the meter-in pressure of the hydraulic motor 27, and the pressure detected by the pressure sensor 87b is the meter-out pressure thereof.

In the meantime, for example, if the swing control lever 72 is operated such that the swing structure swings to the right, the swing spool 44 switches to position B, thus reducing the opening area of the bleed-off restrictor and increasing the opening areas of meter-in and meter-out restrictors. Hydraulic fluid delivered from the hydraulic pump 41 is sent to port B of the swing hydraulic motor 27 through the meter-in restrictor of position B. Hydraulic fluid returning from the swing hydraulic motor 27 returns to the tank through the meter-out restrictor of position B. Such regulation of hydraulic fluid causes the swing hydraulic motor 27 to turn clockwise, the direction opposite to that for position A. Further, in this case, hydraulic fluid flows from port B to port A. Therefore, the pressure detected by the pressure sensor 87a is the meter-out pressure of the hydraulic motor 27, and the pressure detected by the pressure sensor 87b is the meter-in pressure thereof.

It should be noted that when the swing spool 44 is at an intermediate position between the neutral position O and position A, hydraulic fluid delivered from the hydraulic pump 41 is distributed between the bleed-off and meter-in restrictors. The same holds true when the swing spool 44 is at an intermediate position between the neutral position O and position B.

Referring back to FIGS. 2 and 3, the controller 80 controls the hydraulic pump 41, relief pressures of the relief valves 28 and 29, and the power control unit 55 using signals such as swing control lever signals (swing pilot pressures) from the pressure sensors 74, swing hydraulic motor pressures from the pressure sensors 87, and a swing motor speed from the power control unit 55. It should be noted that electric-hydraulic signal converters 75c to 75e illustrated in FIG. 3 convert an electric signal from the controller 80 into a hydraulic pilot signal and correspond, for example, to electromagnetic proportional valves.

On the other hand, the controller 80 includes, as illustrated in FIG. 3, a fault monitoring/fault processing control section 81, an energy management control section 82, a hydraulic-electric combined swing control section 83, a hydraulic-only swing control section 84, a switching control section 85, and a pump flow rate control section 90. The switching control section 85 switches between driving by the hydraulic-electric combined swing control section 83 and driving by the hydraulic-only swing control section 84.

The controller 80 issues instructions to the control valve 42 and the power control unit 55, performing tasks including switching between hydraulic-only swing mode and hydraulic-electric combined swing mode, controlling the swing motion in each mode, monitoring faults in the electric motor system, and managing energy.

The hydraulic-electric combined swing control section 83 receives swing pilot pressure signals, a swing motor speed, and swing hydraulic pressures (meter-in and meter-out pressures). Each of the swing pilot pressure signals is output from the swing control lever 72 and converted into an electric signal by the hydraulic-electric signal converter (e.g.

pressure sensor) 74 and represents the operation amount and direction of operation of the swing control lever 72. The swing motor speed is output from the power control unit 55 and represents the rotation speed of the upper swing structure 20. Each of the swing hydraulic pressures is output from the control valve 42 and converted into an electric signal by the pressure sensor (hydraulic-electric signal converter 87*a* or 87*b*). Further, the hydraulic-electric combined swing control section 83 outputs a swing electric motor torque instruction to the power control unit 55, a pump displacement volume instruction to the hydraulic pump 41 (regulator 88), and a relief pressure switching signal to the port A side relief valve 28 and the port B side relief valve 29 (refer to FIG. 2).

The swing motor speed output from the power control unit 55 is equal to the rotation speed of the upper swing structure 20 mechanically coupled to the swing electric motor 25 and also equal to the rotation speed of the swing hydraulic motor 27. In the present embodiment, the swing motor speed is mainly used to represent the former or the rotation speed (swing speed) of the upper swing structure 20. The power control unit 55 can use a known method to calculate the swing motor speed. For example, the swing motor speed can be calculated from the voltage value developed by the swing electric motor 25 or the current flow value to the swing electric motor 25. Alternatively, rather than using this configuration, a speed sensor 86 (refer to FIG. 4) that detects the rotation speed (revolution speed) of the upper swing structure 20 may be attached around the output shaft of the swing mechanism 26 coupled to the upper swing structure 20 such that the rotation speed value detected by the speed sensor 86 is output to the controller 80 for use as the speed of the upper swing structure 20. Still alternatively, rather than using the speed sensor 86, a speed sensor may be installed around the output shaft of the swing electric motor 25 or the swing hydraulic motor 27 such that the rotation speed of the upper swing structure 20 is detected by factoring the speed reduction ratio of the swing mechanism 26 into the sensor-detected speed value.

The pump flow rate control section 90 calculates the output (absorbing torque) of the hydraulic pump 41 required for the operation desired by the operator based on various information including the pilot pressures output from the control levers 72 and 73, loads acting on the respective hydraulic actuators, and the engine speed, thus controlling the flow rate of the hydraulic pump 41 to a value required for the output in consideration of the delivery pressure of the hydraulic pump 41. The pump flow rate control section 90 can output, to the regulator 88 and the engine 22, instructions required to achieve a desired pump flow rate. These instructions control the displacement volume (tilting angle) of the hydraulic pump 41 and/or the engine speed. It should be noted, however, that we assume here for simplified description that the pump flow rate is controlled by the pump displacement volume, and that no specific description will be given of the engine speed control associated with the pump flow rate control. A pump flow rate instruction output from the pump flow rate control section 90 is converted into a hydraulic signal via the electric-hydraulic signal converter 75*c* and supplied to the regulator 88. The regulator 88 changes the pump displacement volume based on the hydraulic signal, thus controlling the flow rate of the hydraulic pump 41.

The hydraulic-only swing control section 84 receives a swing pilot pressure signal from the swing control lever 72 and converted into an electric signal by the hydraulic-electric signal converter 74. The hydraulic-only swing control section 84 outputs a hydraulic swing characteristic correction instruction and a swing pilot pressure correction signal to the control valve 42.

If the power control unit 55, the swing electric motor 25, the capacitor 24, or other electric motor system is found to be defective, faulty, or in a warning condition, or if the stored charge amount of the capacitor 24 falls outside a predetermined region, the fault monitoring/fault processing control section 81 and the energy management control section 82 switch the switching control section 85 to select the hydraulic-only swing control section 84, thus switching from hydraulic-electric combined swing mode over to hydraulic-only swing mode. The swing hydraulic system is designed to operate in a coordinated fashion with the swing electric motor 25. Therefore, the hydraulic-only swing control section 84 outputs a swing driving characteristic correction instruction and a swing pilot pressure correction signal (L/R) to the electric-hydraulic signal converters 75*d* and 75*e*, respectively, and proceeds with correction in such a manner that the driving torque or braking torque of the swing hydraulic motor 27 is increased, thus keeping the swing operability intact even in the absence of torque of the swing electric motor 25.

A hydraulic-only swing mode fixing switch 77 is used to fix the mode to hydraulic-only swing mode for some reason (e.g., when the electric motor system is defective or when a specific attachment is fitted). When the fixing switch 77 is set to the ON position, the switching control section 85 is fixed such that the hydraulic-only swing control section 84 is selected. This allows for selection of hydraulic-only swing mode even when the fault monitoring/fault processing control section 81 and the energy management control section 82 do not switch the switching control section 85 to the hydraulic-only swing control section 84 as above.

Figure 5:
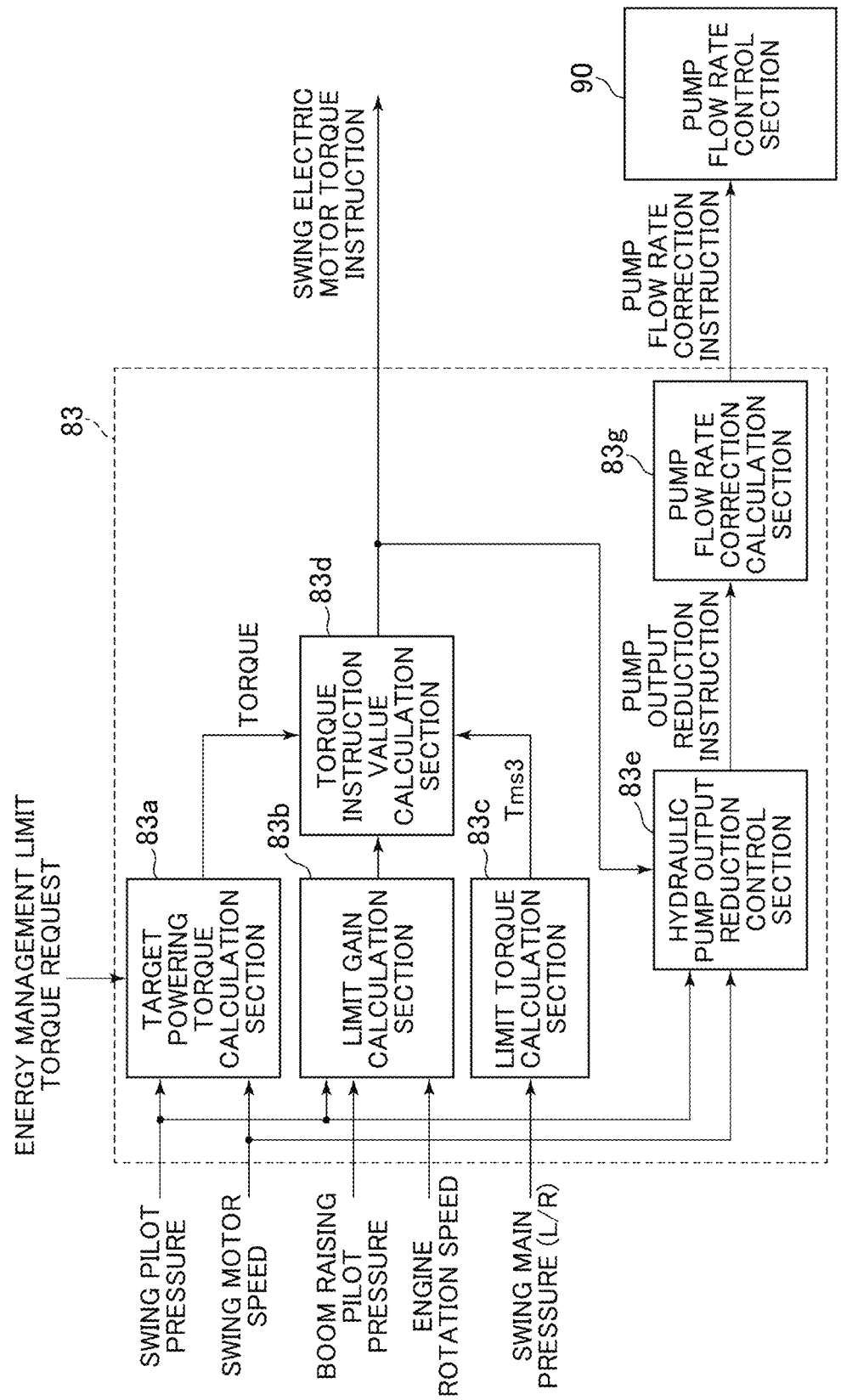
FIG. 5 is part of a functional block diagram of a hydraulic-electric combined swing control section 83.

FIG. 5 is part of a functional block diagram of the hydraulic-electric combined swing control section 83. As illustrated in FIG. 5, the hydraulic-electric combined swing control section 83 includes a target powering torque calculation section 83*a*, a limit gain calculation section 83*b*, a limit torque calculation section 83*c*, a torque instruction value calculation section 83*d*, a hydraulic pump output reduction control section 83*e*, and a pump flow rate correction calculation section 83*g*.

The target powering torque calculation section 83*a* receives a swing pilot pressure and a swing motor rotation speed and calculates a target powering torque of the swing electric motor 25 and then outputs that. The target powering torque value is limited by the energy management limit torque demand output from the energy management control section 82 to fall within the range of torque that can be produced by the swing electric motor 25 with the remaining charge amount of the capacitor 24 at that time. More specifically, the upper torque limit of the swing electric motor 25 drops with reduction in voltage of the capacitor 24.

The limit gain calculation section 83*b* defines a gain K1 appropriate to a boom raising operation pilot pressure output from the control lever 73. The maximum value of the gain K1 is 1, and the larger the boom raising operation pilot pressure, the smaller the control gain K1. The control gain K1 eventually becomes 0. Further, a gain K2 is similarly defined that is appropriate to the engine speed. The maximum value of the gain K2 is 1, and the gain K2 is set such that the smaller the engine speed, the smaller the control gain K2. Still further, a gain K3 is defined that is appropriate to the swing pilot pressure. The present embodiment is configured such that the gain is large in the intermediate swing pilot pressure region.

The limit torque calculation section 83c receives a main swing pressure signal of the swing hydraulic motor 27 and the control gain K3 calculated by the limit gain calculation section 83b. The limit torque calculation section 83c calculates a limit torque Tms3 by multiplying the torque of the swing hydraulic motor 27, calculated from the main swing pressure of the swing hydraulic motor 27, by the gain K3, outputting the calculated limit torque Tms3 to the torque instruction value calculation section 83d.

The torque instruction value calculation section 83d receives the above control gains K1 and K2 and the above limit torque Tms3. The torque instruction value calculation section 83d calculates a target torque T by multiplying the target powering torque, calculated by the target powering torque calculation section 83a, by the above control gains K1 and K2. Further, the torque instruction value calculation section 83d receives the limit torque Tms3 calculated by the limit torque calculation section 83c and performs a calculation to limit the target torque T with the value of the limit torque Tms3 (i.e., if the target torque T exceeds the limit torque Tms3, the limit torque Tms3 serves as a torque instruction value, and if the target torque T is equal to or less than the limit torque Tms3, the target torque T serves as a torque instruction value), outputting the resultant torque to the power control unit 55 and the hydraulic pump output reduction control section 83e. The power control unit 55 produces a torque on the swing electric motor 25 based on this torque instruction value as the torque instruction value.

The hydraulic pump output reduction control section 83e receives a torque instruction value calculated by the torque instruction value calculation section 83d and outputs, to the pump flow rate correction calculation section 83g, an instruction to reduce the output of the hydraulic pump 41 (pump output reduction instruction) such that the torque of the swing hydraulic motor 27 drops by as much as the torque output from the swing electric motor 25.

The pump flow rate correction calculation section 83g outputs an instruction to reduce the flow rate of the hydraulic pump 41 (pump flow rate correction instruction) such that the pump output reduction instruction calculated by the hydraulic pump output reduction control section 83e is adhered to. More specifically, a pump flow rate correction instruction is output from the pump flow rate correction calculation section 83g to the pump flow rate control section 90. The pump flow rate control section 90 outputs, to the electric-hydraulic signal converter 75c, a pump displacement volume instruction reflecting the pump flow rate correction instruction. Then, the electric-hydraulic signal converter 75c outputs, to the regulator 88, a control pressure appropriate to the pump displacement volume instruction, thus allowing the regulator 88 to control the tilting angle of the swash plate and controlling the flow rate of the hydraulic pump 41.

As described above, in the present embodiment, the hydraulic-electric combined swing control section 83 restricts the output of the hydraulic pump 41 such that the torque of the swing hydraulic motor 27 drops by as much as the torque output from the swing electric motor 25. That is, the torque required for the swing motion of the upper swing structure 20 instructed based on the operation amount and direction of operation of the swing control lever 72 is produced by combining the torques of the swing electric motor 25 and the swing hydraulic motor 27 to cause the upper swing structure 20 to be swung and driven. This provides a comparable swing speed even when the same operation is performed in the present embodiment as in a conventional machine that swings the upper swing structure 20 with the swing hydraulic motor 27 alone. It should be noted that if, for example, the upper swing structure 20 is driven with the swing electric motor 25 alone, the swing hydraulic motor 27 produces no torque. If the swing electric motor 25 produces no torque, the upper swing structure 20 is driven with the torque produced by the swing hydraulic motor 27 alone.

Figure 6:
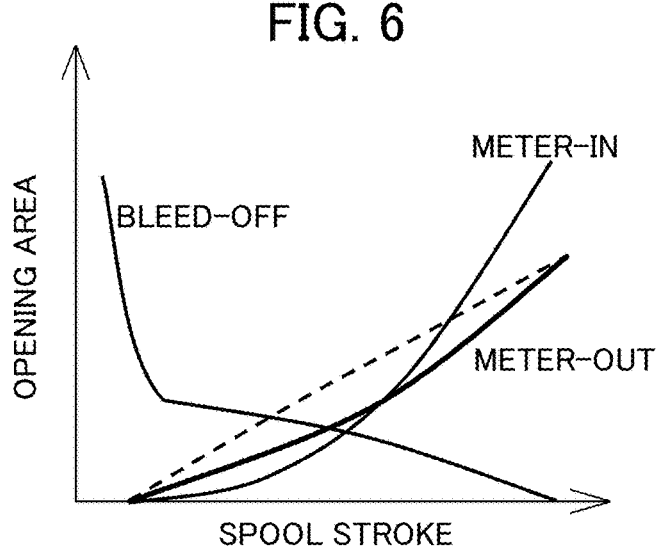
FIG. 6 is a relational diagram between a bleed-off opening area and meter-in and meter-out opening areas relative to a spool stroke of a swing spool 44.

FIG. 6 illustrates a bleed-off opening area and meter-in and meter-out opening areas relative to the spool stroke of the swing spool 44 in the present embodiment. The spool stroke varies with change in the operation amount of the swing control lever 72. Therefore, the spool stroke may be considered a operation amount of the swing lever.

The solid line of the meter-out opening area illustrated in FIG. 6 represents an opening area of the swing hydraulic motor that provides excellent operability in a construction machine that drives its upper swing structure with a swing hydraulic motor alone (may be referred to as a "conventional machine"). On the other hand, the dotted line associated with the meter-out opening area, illustrated in FIG. 6 represents the size of the meter-out opening area of the swing spool 44 in the present embodiment. In the present embodiment, the size of the meter-out opening area is set such that it is about the same as the size of the area shown by the solid line at the start and end points, and that it is larger in the intermediate region.

In this case, the larger the opening area of the meter-out restrictor of the swing spool 44, the smaller the braking torque obtained from the swing hydraulic motor 27. Therefore, the magnitude of the braking torque depends on the size of the opening area of the meter-out restrictor. As a result, when the operation amount of the swing lever is in the intermediate region, the braking torque of the swing hydraulic motor 27 is smaller than that of the swing hydraulic motor in a conventional machine. On the other hand, when the operation amount of the swing lever is neutral and maximum, the opening area is about the same as that shown by the solid line. Therefore, the magnitude of the braking torque of the swing hydraulic motor in a conventional machine is set such that it is about the same as that of the swing hydraulic motor 27.

As described above, the construction machine according to the present embodiment determines the magnitude of the braking torque of the swing hydraulic motor 27 in accordance with the meter-out opening area of the swing spool 44 that is determined in relation to the operation amount of the swing control lever 72. As for the driving torque, on the other hand, the bleed-off opening area of the swing hydraulic motor 27 is determined in such a manner as to ensure the operability comparable to that of a conventional machine that drives its upper swing structure with a swing hydraulic motor alone. Therefore, the same features as in a conventional machine are available.

A description will be given below of how the hydraulic-electric combined swing control section 83 controls the swing electric motor 25 and the output of the hydraulic pump 41 (pump output).

First, a rotation speed $\omega$ of the swing electric motor 25 (rotation speed of the upper swing structure 20) can be expressed by formula (1) by using a torque Tom of the swing hydraulic motor 27 and a torque Tem of the swing electric motor 25. The torque Tom of the swing hydraulic motor 27 can be expressed by formula (2) by using the meter-in and meter-out pressures.

$$\frac{d\omega}{dt} = \frac{1}{J_s} \cdot (T_{om} + T_{em} - T_{loss}) \quad (1)$$

$$T_{om} = \frac{q}{2\pi} \cdot (P_{mi} - P_{mo}) \cdot R \quad (2)$$

Here, Js in formula (1) represents an inertial moment of the upper swing structure 20, and Tloss a loss of the swing parts.

In the present embodiment, in order to achieve operability comparable to that for operation with the hydraulic pump alone, even with the swing electric motor 27 powering as well, it is also necessary that the rotation speed ω of the swing electric motor be comparable when the swing control lever 72 is operated in the same manner. That is, when the same lever operation is performed, the torque of the swing electric motor and the pump output are controlled such that ω is comparable between when Tem=0 and when Tem≠0 in formula (2).

Figure 7:
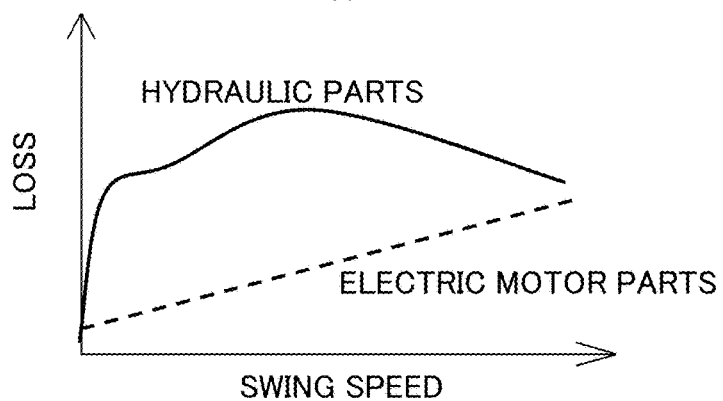
FIG. 7 is a diagram illustrating a loss of hydraulic parts during steady-state swing when a swing motion is made with a swing hydraulic motor alone and a loss of electric motor parts when a swing motion is made at a comparable speed with an electric motor alone.

FIG. 7 illustrates, by a solid line, a loss of hydraulic parts during steady-state swing (a condition where the rotation speed of the upper swing structure 20 converges to a constant) when a swing motion is made with the swing hydraulic motor alone and, by a dotted line, a loss of electric motor parts during steady-state swing when a swing motion is made at a comparable speed with the swing electric motor alone. The loss of hydraulic parts is relatively large particularly where the swing speed is small, i.e., in the region from fine operation to halfway swing operation because the pump output tends to be large relative to the output of the swing hydraulic motor. The reason for this is that the opening area of the swing hydraulic motor is set large to ensure excellent responsiveness, and that, as a result, the pump output is large. On the other hand, where the swing speed is high, i.e., where the lever is approximately fully operated, the loss of hydraulic parts relatively diminishes as compared to other cases.

On the other hand, the loss of electric motor parts tends to increase with increase in swing speed, i.e., in accordance with the operation amount of the swing control lever. The reason for this is that the swing output increases with increase in swing speed during swing of the swing structure with the swing electric motor, thus causing more energy to be charged into or discharged from the capacitor.

For this reason, in the present embodiment, the swing structure is swung and driven with the highly efficient electric motor 25 alone in the fine operation region (low swing speed and small operation amount of the lever), and the swing structure is driven by using the electric motor 25 and the swing hydraulic motor 27 in combination in the swing region with high hydraulic efficiency (medium or high swing speed and moderate or large operation amount of the lever). More specifically, the following output distribution is set between the electric motor 25 and swing the hydraulic motor 27.

Figure 8:
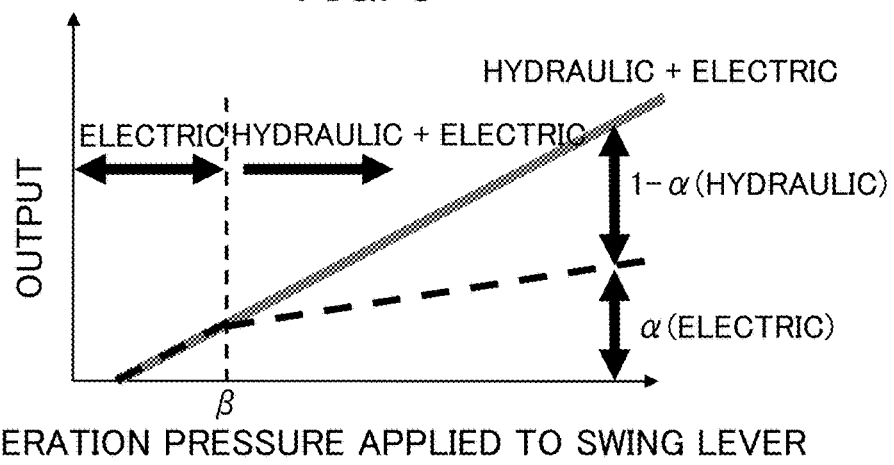
FIG. 8 is an example of a swing output characteristic where an output distribution between an electric motor 25 and a swing hydraulic motor 27 is set in accordance with a operation pressure applied to a swing lever.

In the present embodiment, assuming that the output required for swing motion of the upper swing structure 20 (demanded torque) determined based on the operation amount of the swing control lever 72 is 1, a ratio α of the output (torque) is produced by the swing electric motor 25, and the remaining ratio (i.e., 1−α) is produced by the swing hydraulic motor 27, thus ensuring operability comparable to that of conventional machines. FIG. 8 illustrates an example of setting of an output distribution (torque distribution) between the electric motor 25 and the swing hydraulic motor 27 in accordance with the operation pressure applied to the swing lever (also referred to as the swing pilot pressure) as a swing output characteristic according to the present embodiment.

The present embodiment is configured such that the demanded torque is output by the electric motor 25 alone (i.e., α=1) in the fine operation region where the operation pressure applied to the swing lever is equal to a setting value β or less, as illustrated in FIG. 8, in the fine operation region, the output of the electric motor 25 increases with increase in the operation pressure applied to the swing control lever. It should be noted that the setting value β is 1.5 MP or so.

On the other hand, the present embodiment is configured such that, in the region beyond the setting value β, the demanded torque is shared between electric motor 25 and the hydraulic motor 27, and in this region, the ratio α of output of the electric motor 25 drops with increase in the operation pressure applied to the swing lever.

The reason for this is that, in the region where the operation pressure applied to the swing lever is low with low swing speed (region where the applied pressure is equal to or less than β), higher efficiency can be achieved by driving the swing structure with the electric motor 25 rather than the swing hydraulic motor 27 as described above, and that, in the region where the operation pressure applied to the swing lever is high (region where the applied pressure is beyond β), on the other hand, higher efficiency can be achieved by driving the swing structure with the hydraulic motor 27. This approach is intended to ensure reduced energy consumption.

It should be noted that, as a condition for determining the setting value β, the swing electric motor 25 alone needs to be able to produce the demanded torque when the operation pressure applied to the swing lever is β. Further, at that time, it is preferred that another condition, namely, the flow rate of the hydraulic pump 41 can be reduced to the standby flow rate or close thereto, be added. The reason for this is that the loss of hydraulic parts can be significantly reduced by reducing the pump flow rate to close to the standby flow rate.

Incidentally, the demanded torque necessary for the upper swing structure varies with change in not only the operation amount of the swing control lever 72 but also the swing speed (rotation speed) of the upper swing structure 20. More specifically, the larger the operation amount of the swing control lever 72, the larger the demanded torque. Further, the lower the rotation speed of the upper swing structure 20, the larger the demanded torque. Therefore, the higher the rotation speed of the upper swing structure 20, the lower the demanded torque. Accordingly, when the rotation speed of the upper swing structure 20 converges to a constant value (during steady-state swing), the demanded torque can also be produced by the swing electric motor 25 alone even in the region where the operation pressure applied to the swing lever is larger than β. As illustrated in FIG. 7, the loss of hydraulic parts is larger than that of electric motor parts during steady-state swing across the entire region. Therefore, if the demanded torque can be produced by the swing electric motor 25 alone, it is preferred that the demanded torque be produced by the swing electric motor 25 alone for improved system efficiency.

In the hydraulic excavator having a swing mechanism as described in the present embodiment, on the other hand, the swing electric motor 25 and the swing hydraulic motor 27 are mechanically coupled. Therefore, even if the swing electric motor 25 alone produces the demanded torque, the swing hydraulic motor 27 rotates together, thus resulting in hydraulic loss.

For this reason, a description will be given below of how the torque of the swing electric motor 25 and the flow rate of hydraulic fluid supplied to the swing hydraulic motor 27 are determined from the view point of improved system efficiency in the present embodiment if the demanded torque can be produced with the swing electric motor 25 alone (i.e., when the operation amount of the swing control lever is in the fine operation region or during steady-state swing despite the fact that the operation amount of the swing control lever exceeds the fine operation region).

A description will be given first of how the torque of the swing electric motor 25 is determined when the swing pilot pressure and the flow rate of the hydraulic pump 41 are maintained constant. FIG. 9 illustrates a relationship between the torque of the swing electric motor 25 (electric motor torque) and the loss of the hydraulic parts (valve loss) when the swing pilot pressure and the flow rate of the hydraulic pump 41 are maintained constant while gradually increasing the electric motor torque of the swing electric motor 25. From FIG. 9, there is a tendency that the valve loss gradually drops with increase in the electric motor torque up to a certain electric motor torque (referred to as a target torque Tms*) is reached, and that when the certain electric motor torque is exceeded, the valve loss begins to increase again.

The reason why the valve loss shows a downward convex curve as illustrated in FIG. 9 is that the loss of valve parts associated with the swing hydraulic motor 27 can be broken down as illustrated in FIG. 10. FIG. 10 is a diagram illustrating the decomposition of the valve loss shown in FIG. 9 into a bleed-off loss, a meter-in loss, and a meter-out loss. In FIG. 10, the torque of the swing hydraulic motor 27 drops with gradually increase in the electric motor torque in the region equal to or less than the target torque (Tms*). This causes the bleed-off loss, the component that accounts for the majority of the valve loss, to drop, thus reducing the valve loss. In the region beyond the target torque (Tms*), however, the meter-out loss increases more than the drop in the bleed-off loss with increase in the electric motor torque, thus causing the valve loss to increase again.

FIG. 11 illustrates a relationship between the electric motor torque and a main swing pressure (meter-in and meter-out pressures) in the case of FIGS. 9 and 10 (i.e., when the swing pilot pressure is maintained constant). When the electric motor torque is less than the target torque (Tms*), the meter-in pressure is larger than the meter-out pressure (representing a condition where the hydraulic motor torque Tom is positive in formula (2)). As a result, the loss is larger because the swing hydraulic motor 27 produces a drive torque. In this case, the closer the electric motor torque is made to the target torque (Tms*) by increasing the electric motor torque, the smaller the loss becomes. On the other hand, if the electric motor torque is larger than the target torque (Tms*), the meter-in pressure is smaller than the meter-out pressure (representing a condition where the hydraulic motor torque Tom is negative in formula (2)). As a result, the loss is larger because the swing hydraulic motor 27 produces a braking torque. In this case, the closer the electric motor torque is made to the target torque (Tms*) by reducing the electric motor torque, the smaller the loss becomes. As a result, as a whole, the loss of hydraulic parts drops temporarily with increase in the electric motor torque as illustrated in FIG. 9, but increases again when the electric motor torque exceeds the target torque (Tms*). Therefore, it is clear from FIG. 11 that the case where the valve loss is minimal in FIG. 9 and where "the electric motor torque matches the target torque (Tms*)" is the case where the meter-in pressure is equal to the meter-out pressure and where the torque of the swing hydraulic motor 27 is 0.

It is clear from FIGS. 9 and 11 that if the swing pilot pressure and the pump flow rate are maintained constant, there is an electric motor torque value that provides the minimum valve loss for each swing motor rotation speed. The distribution of this electric motor torque value is illustrated in FIG. 12.

FIG. 12 illustrates, for each rotation speed of the swing electric motor 25, a relationship between the torque of the swing electric motor 25 (electric motor torque) and the loss of hydraulic parts (valve loss) when the electric motor torque is gradually increased while the swing pilot pressure and the flow rate of the hydraulic pump 41 are maintained constant.

In FIG. 12, the relationship in magnitude of rotation speed is W1<W2<W3. The higher the rotation speed, the smaller the electric motor torque (target torque) Tms* that provides the minimum loss. By connecting the target torques Tms* for the respective rotation speeds, it is possible to draw an approximate downward curve to the left where the target torque Tms* monotonically decreases with increase in rotation speed as illustrated in FIG. 12. As a result, the inventor et al. have found that the optimal system efficiency can be achieved by producing an electric motor torque such that the loss is minimal at each rotation speed in accordance with the curve. It is possible to bring the meter-in and meter-out pressures of the swing hydraulic motor 27 in agreement by controlling the torque of the swing electric motor 25 in this manner, thus keeping the loss to a minimum.

Based on the results shown in FIG. 12, if the swing pilot pressure (operation amount of the swing control lever 72) is varied with the flow rate of the hydraulic pump 41 maintained constant, the target torque Tms* can be expressed for each rotation speed of the swing electric motor 25 as illustrated in FIG. 13.

FIG. 13 is a diagram illustrating, for each swing speed, a relationship between the target torque Tms* of the swing electric motor 25 and the swing pilot pressure. It is assumed that the relationship in magnitude of rotation speed in FIG. 3 is W0<W1<W2. As illustrated in FIG. 13, the target torque Tms* increases with increase in operation amount of the swing control lever 72 and converges to a predetermined value, and the convergence value decreases with increase in the speed of the electric motor 25.

As a result, the flow rate of the hydraulic pump 41 is maintained at a predetermined value. So long as no energy management limit torque demand is made, the target powering torque calculation section 83a of the hydraulic-electric combined swing control section 83 can determine a target powering torque that provides excellent system efficiency by receiving the swing pilot speed and the swing speed and using FIG. 13.

A description will be given next of the determination of the flow rate of the hydraulic pump 41 when the swing pilot pressure and the torque of the swing electric motor 25 are maintained constant. FIG. 14 illustrates a relationship between the flow rate of the hydraulic pump 41 (pump flow rate) and the loss of the hydraulic parts (valve loss) when the pump flow rate is increased gradually with the swing pilot pressure and the torque of the swing electric motor 25 are maintained constant. As illustrated in FIG. 14, there is a tendency that the valve loss gradually drops with increase in the pump flow rate up to a certain pump flow rate (referred to as a target flow rate Q*) is reached, and that when the certain pump flow rate Q* is exceeded, the valve loss begins to increase again in the same manner as with the electric motor torque shown in FIG. 9 described above.

FIG. 15 illustrates a relationship between the pump flow rate and the main swing pressure in the case of FIG. 14. It is clear from FIG. 15 that the positional relationship between the meter-in and meter-out pressures is opposite to that in the case of the torque of the electric motor 25 illustrated in FIG. 11. More specifically, if the pump flow rate is smaller than the target flow rate (Q*), the meter-in pressure is smaller than the meter-out pressure (representing a condition where the hydraulic motor torque Tom is negative in formula (2)). As a result, the loss is larger because the swing hydraulic motor 27 produces a braking torque. In this case, the closer the pump flow rate is made to the target flow rate (Q*) by increasing the pump flow rate, the smaller the loss becomes. On the other hand, if the pump flow rate is larger than the target flow rate (Q*), the meter-in pressure is larger than the meter-out pressure (representing a condition where the hydraulic motor torque Tom is positive in formula (2)). As a result, the loss is larger because the swing hydraulic motor 27 produces a drive torque. In this case, the closer the pump flow rate is made to the target flow rate (Q*) by reducing the pump flow rate, the smaller the loss becomes. As a result, as a whole, the loss of hydraulic parts drops temporarily with increase in the pump flow rate as illustrated in FIG. 14, but increases again when the pump flow rate exceeds the target flow rate (Q*). Therefore, it is clear from FIG. 15 that the case where the valve loss is minimal in FIG. 14 and where "the pump flow rate matches the target flow rate (Q*)" is the case where the meter-in pressure is equal to the meter-out pressure and where the torque of the swing hydraulic motor 27 is 0.

It is clear from FIGS. 14 and 15 that if the swing pilot pressure and the electric motor torque are maintained constant, there is a pump flow rate value that provides the minimum valve loss for each swing motor rotation speed. Although the illustration of the distribution of the pump flow rate at this time is omitted, it is possible, by connecting the target flow rates Q* for the respective rotation speeds, to draw an approximate downward curve to the left where the target flow rate Q* monotonically decreases with increase in rotation speed in the same manner as illustrated in FIG. 12. As a result, the inventor et al. have found that the optimal system efficiency can be achieved as a general rule by producing a pump flow rate such that the loss is minimal at each rotation speed in accordance with the curve. It is possible to bring the meter-in and meter-out pressures of the swing hydraulic motor 27 in agreement by controlling the flow rate of the hydraulic pump 41 in this manner, thus keeping the loss to a minimum.

A description will be given next of the fact that the rotation speed of the swing hydraulic motor 27 (upper swing structure 20) can be controlled by flow rate control of the hydraulic pump 41. FIG. 16 is a simplified diagram of a hydraulic circuit according to the swing hydraulic motor 27 in the present embodiment. Various reference numerals according to the hydraulic circuit that are used in the formulas described later are shown in FIG. 16. A meter-in flow rate Qmi, a meter-out flow rate Qmo, and a bleed-off flow rate Qbo in FIG. 16 represent flow rates of hydraulic fluid flowing through three channels formed in the swing spool 44 shown in FIG. 4, respectively.

First, a rotation speed W of the hydraulic motor 27 and the swing electric motor 25 (swing motor rotation speed) is proportional to a flow rate (motor flow rate) Qmt of the swing hydraulic motor, and the relationship therebetween is expressed by the following formula:

$$Q_{mt} = \frac{q \cdot R}{2\pi} \cdot \omega \qquad (3)$$

Here, q represents a capacity of the swing hydraulic motor 27, and R a gear ratio (speed reduction ratio between the two motors 25 and 27 and the upper swing structure 20). The swing motor rotation speed W is defined to be positive for counterclockwise rotation, and negative for clockwise rotation, and the swing hydraulic motor 27 and the swing electric motor 25 are assumed to be identical in rotation speed. It is possible to calculate the flow rate Qmt of the swing hydraulic motor (swing motor flow rate) 27 required to achieve the desired swing motor rotation speed W by using formula (3).

Next, the meter-out flow rate Qmo is expressed by the following formula (4):

$$Q_{mo} = C_v \cdot A_{mo} \sqrt{\frac{2 \cdot P_{mo}}{\gamma}} \qquad (4)$$

Here, Cv represents a fluid factor, Amo a meter-out opening area of the swing hydraulic motor 27, and Pmo a meter-out pressure of the swing hydraulic motor 27. The meter-out opening area Amo is set such that excellent operability can be ensured when the swing structure is driven with the swing hydraulic motor 27 alone. The meter-out opening area Amo varies with change in the swing pilot pressure. Assuming that the motor flow rate Qmt is approximately equal to the meter-out flow rate Qmo, and in order to achieve a swing speed comparable to driving with the hydraulic motor 27 alone by the same operation of the control lever in the present embodiment, the comparable motor flow rate Qmt, i.e., the meter-out flow rate Qmo, is necessary from formulas (3) and (4). The meter-out pressure Pmo is expressed by the following formula (5) by modifying the formula (4) and assuming the meter-out flow rate required to achieve the desired swing speed W to be Qmo:

$$P_{mo} = \frac{\gamma}{2} \cdot \frac{Q_{mo}^2}{C_v^2 \cdot A_{mo}^2} \qquad (5)$$

Further, the meter-in flow rate Qmi can be similarly expressed by formula (6) shown below by using the meter-out flow rate Qmo that provides the desired swing speed W. Here, LossQmt represents a loss of swing parts.

$$Q_{mi} = Q_{mt} + \text{Loss}Q_{mt} \qquad (6)$$

Still further, the meter-in flow rate Qmi can be expressed by formula (7) shown below by using the meter-in opening area Ami as is done in formula (4) for the meter-out flow rate Qmo. The meter-in pressure Pmi can be expressed by the following formula (8) by modifying formula (7) in the same manner as for formula (5), expressing it by the meter-in pressure Pmi, and substituting formula (6) into the meter-in flow rate Qmi in the modified formula:

$$Q_{mi} = C_v \cdot A_{mi} \sqrt{\frac{2 \cdot P_{mi}}{\gamma}} \qquad (7)$$

$$P_{mi} = \frac{\gamma}{2} \cdot \frac{Q_{mo}^2}{C_v^2 \cdot A_{mo}^2} = \frac{\gamma}{2} \cdot \frac{(Q_{mi} + LossQ_{mi})^2}{C_v^2 \cdot A_{mo}^2} \quad (8)$$

The meter-out flow rate Qmt that provides the desired swing rotation speed W can be found in advance. Therefore, the meter-in pressure Pmi at that time can be calculated by formula (8).

Further, the bleed-off flow rate Qbo can be expressed by the following formula (9) by using a swing bleed-off opening area Abo:

$$Q_{bo} = C_v \cdot A_{bo} \sqrt{\frac{2 \cdot P_p}{\gamma}} \quad (9)$$

Assuming that the meter-in pressure Pmi is equal to a pump pressure Pp in formula (8), and deleting Pp and γ from formulas (7) and (9), the bleed-off flow rate Qbo can be expressed by the following formula (10):

$$Q_{bo} = \frac{A_{bo}}{A_{mi}} \cdot Q_{mi} \quad (10)$$

Incidentally, a pump flow rate Qp is the sum of the meter-in flow rate Qmi and the bleed-off flow rate Qbo, and can be calculated by the following formula (11):

$$Q_p = Q_{mi} + Q_{bo} = \left(1 + \frac{A_{bo}}{A_{mi}}\right) \cdot Q_{mi} \quad (11)$$

The meter-in flow rate Qmi in formula (11) can be expressed by the meter-in pressure Pmi by using formula (7), and the meter-in pressure Pmi can be expressed by a motor flow rate Qm by using formula (8). Further, the motor flow rate Qmt can be expressed by the motor rotation speed W by using formula (3). That is, the pump flow rate Qp can be expressed by the motor rotation speed W. Therefore, the swing motor rotation speed W can be controlled to a desired speed by controlling the pump flow rate Qp.

It should be noted that if the target motor flow rate Qmt is determined for each of the swing motor rotation speeds W based on formula (3) during actual control work, it is possible to calculate the meter-in pressure Pmi using the motor flow rate Qmt and formula (8) first, the meter-in flow rate Qmi using the meter-in pressure Pmi and formula (7) next, and further the required pump flow rate Qp using the meter-in flow rate Qmi and formula (11). In an actual control logic, it is only necessary to set, in advance, the target pump flow rate Qp for the swing motor rotation speed W determined for each operation amount of the swing control lever 72. That is, it suffices to store combinations of the lever operation amount and the pump flow rate Qp in the form of a table in a storage device (e.g., semiconductor memory), search for the pump flow rate Qp for the lever operation amount detected, for example, by a pressure sensor from the table, and control the flow rate of the hydraulic pump 41 using the controller 80 with the found flow rate.

Incidentally, in the present embodiment, the swing structure 20 is driven with the swing electric motor 25 alone, and the pump flow rate Qp is controlled such that Pmi=Pmo (meter-in pressure=meter-out pressure) as described above. Therefore, "Qmi=Ami·Qmo/Amo" can be derived from formulas (4) and (8), and formula (11) can be eventually expressed as formula (12) shown below.

$$Q_p = \left(1 + \frac{A_{bo}}{A_{mi}}\right) \cdot \frac{A_{mi}}{A_{mo}} \cdot Q_{mo} \quad (12)$$

The pump flow rate Qp calculated above is output to the electric-hydraulic signal converter 75c as a pump displacement instruction from the pump flow rate control section 90. The electric-hydraulic signal converter 75c outputs the control pressure appropriate to this electric signal to the regulator 88. The regulator 88 controls the tilting angle of the swash plate, thus controlling the flow rate of the hydraulic pump 41. At this time, controlling the pump flow rate such that the meter-in pressure is equal to the meter-out pressure keeps the loss of hydraulic parts to a minimum. It should be noted that the flow rate of the hydraulic pump 41 is determined based on the product of the pump rotation speed (engine speed) and the pump displacement (tilting angle of the swash plate). Therefore, the flow rate of the hydraulic pump 41 can be controlled by changing the engine speed while maintaining the tilting angle of the swash plate unchanged. The pump flow rate may be controlled by controlling the engine speed rather than the tilting angle.

A description will be given next of a specific example of a flowchart of steps handled by the system according to the present embodiment for creating a condition where the meter-in and meter-out pressures of the swing hydraulic motor 27 are equal to each other as described above.

FIG. 17 is a diagram illustrating a flowchart for creating a condition where the meter-in and meter-out pressures of the swing hydraulic motor 27 are equal to each other by controlling the torque of the swing electric motor 25 with the flow rate of the hydraulic pump 41 maintained at a predetermined target value if the torque required to drive the upper swing structure 25 can be produced with the swing electric motor 25 alone. The torque of the swing electric motor 25 is controlled by the method described in FIGS. 9 to 13.

The steps in the flowchart illustrated in FIG. 17 are performed during operation of the swing control lever 72. When the operation of the swing control lever 72 begins, the steps in the flowchart start. The hydraulic-electric combined swing control section 83 receives the swing pilot pressure from the swing control lever 72 and the swing electric motor rotation speed (swing motor speed) from the power control unit 55 (S100 and S105), calculating the demanded torque necessary for swing motion of the upper swing structure 20 (sum of the torques to be produced by the swing electric motor 25 and the swing hydraulic motor 27) (S110).

Next, the hydraulic-electric combined swing control section 83 judges whether the demanded torque calculated in S110 can be produced with the swing electric motor 25 alone (S115). When it is judged in S115 that the demanded torque can be produced with the swing electric motor 25 alone, the control procedure according to the present invention will be conducted. More specifically, the hydraulic-electric combined swing control section 83 outputs, to the power control unit 55, a torque instruction demanding a torque value equivalent to the demanded torque in S110, thus allowing the swing electric motor 25 to be controlled by the inverter of the power control unit 55 based on the torque instruction (S120).

In this case, all the demanded torque is borne by the swing electric motor 25. Therefore, the hydraulic-electric combined swing control section 83 (pump flow rate correction calculation section 83g) does not output any pump flow rate correction instruction to the pump flow rate control section 90 (S125). As a result, the pump flow rate control section 90 controls the pump flow rate to a predetermined value determined based on other condition without correcting the flow rate based on a pump flow rate correction instruction.

In S130, the hydraulic-electric combined swing control section 83 receives swing hydraulic pressures, pressures detected by the pressure sensors 87a and 87b, representing the meter-in and meter-out pressures. The hydraulic-electric combined swing control section 83 judges whether the absolute value of the difference between the meter-in and meter-out pressures (hereinafter may be referred to as a "pressure difference") is smaller than a setting value ϵ. When the pressure difference is smaller than the setting value ϵ, the hydraulic-electric combined swing control section 83 identifies that the meter-in and meter-out pressures are equal. When the pressure difference is smaller than the setting value ϵ, the hydraulic-electric combined swing control section 83 returns to S100 without handling the swing electric motor torque instruction, repeating the subsequent steps as described above.

On the other hand, when the pressure difference is equal to or larger than the setting value ϵ in S130, the hydraulic-electric combined swing control section 83 judges whether the meter-out pressure is larger than the meter-in pressure based on the input pressures from the pressure sensors 87a and 87b (S135). When it is judged in S135 that the meter-out pressure is larger than the meter-in pressure, this means, from FIG. 11, that the hydraulic motor 27 is producing a braking torque. Therefore, the hydraulic-electric combined swing control section 83 reduces the torque instruction for the swing electric motor 25 from the immediately previous output pressure value (i.e., pressure value output in S120, S140, or S145) so as to bring the meter-in and meter-out pressures closer (S140), and then returns to S130. When S140 is complete, the hydraulic-electric combined swing control section 83 returns to S130 to judge again whether the pressure difference is smaller than the setting value ϵ. The hydraulic-electric combined swing control section 83 controls the torque of the swing electric motor 25 until the judgment in S130 is true.

It should be noted that the same preset value may be used as a decrement in torque in one step in S140. In this case, the meter-in and meter-out pressures gradually approach each other through feedback control. Alternatively, a decrement in torque in S140 may be determined for each magnitude of the pressure difference calculated in S130 so as to quickly bring the meter-in and meter-out pressures closer.

On the other hand, when it is judged in S135 that the meter-in pressure is larger, this means, from FIG. 11, that the hydraulic motor 27 is producing a driving torque. Therefore, the hydraulic-electric combined swing control section 83 increases the torque instruction for the swing electric motor 25 from the immediately previous output pressure (i.e., pressure output in S120, S140, or S145) so as to bring the meter-in and meter-out pressure values closer (S145), and then returns to S130. When S145 is complete, the hydraulic-electric combined swing control section 83 returns to S130 to judge again whether the pressure difference is smaller than the setting value ϵ. The hydraulic-electric combined swing control section 83 controls the torque of the swing electric motor 25 until the judgment in S130 is true. It should be noted that an increment in torque in one step in S145 is set in a similar manner as for S140.

It should be noted that if it is judged in S115 that the demanded torque cannot be produced with the swing electric motor 25 alone, a combined swing step is performed in S150 where the swing hydraulic motor 27 is used in combination with the swing electric motor 25. Specific steps in this case have only a minor connection with the present invention. Therefore, a description thereof will be omitted.

As described above, controlling the torque of the swing electric motor 25 brings the different meter-in and meter-out pressure values closer, even if they are different to each other thus keeping the torque produced by the hydraulic motor 27 to nearly zero level. This minimizes the loss of hydraulic parts and allows a swing motion of the upper swing structure 20 to be handled by the swing electric motor 25 alone that offers minimal loss, thus contributing to significantly reduced fuel consumption owing to improved energy efficiency during swing of the swing structure.

Further, in the above case, the torque of the electric motor 25 is controlled. This provides, as an advantage, better responsiveness than the case in FIG. 18 described later where the hydraulic motor 41 is controlled. Further, if the hydraulic pump 41 supplies hydraulic fluid to other hydraulic actuators in addition to the hydraulic motor 27, controlling the hydraulic motor 41 as illustrated in FIG. 18 may affect control of the other actuators. However, controlling the electric motor 25 as described above makes it less likely, as an advantage, that control of the other hydraulic actuators may be affected by the control according to the invention.

FIG. 18 is a diagram illustrating a flowchart for creating a condition where the meter-in and meter-out pressures of the swing hydraulic motor 27 are equal by controlling the flow rate of the hydraulic pump 41 with the torque of the swing electric motor 25 maintained at a predetermined target value that is determined from the torque required to drive the upper swing structure 25 (demanded torque) when the demanded torque can be produced with the swing electric motor 25 alone. The method described in FIGS. 14 and 15 is used to control the flow rate of the hydraulic pump 41. The steps in the flowchart illustrated in FIG. 18 are performed during operation of the swing control lever 72 as with those of the flowchart illustrated in FIG. 17. The steps from S100 to S135 and S150 are the same as in FIG. 17, and the description thereof will be omitted.

When it is judged in S135 of FIG. 18 that the meter-out pressure is larger than the meter-in pressure, this means, from FIG. 15, that the hydraulic motor 27 is producing a braking torque. Therefore, the hydraulic-electric combined swing control section 83 outputs, to the pump flow rate control section 90, a correction instruction (pump flow rate correction instruction) that increases the flow rate of the hydraulic pump 41 from the immediately previous output flow rate (i.e., flow rate output in S125, S160, or S165) so as to bring the meter-in and meter-out pressure values closer (S160), and then returns to S130. When S160 is complete, the hydraulic-electric combined swing control section 83 returns to S130 to judge again whether the pressure difference is smaller than the setting value ϵ. The hydraulic-electric combined swing control section 83 controls the flow rate of the hydraulic pump 41 until the judgment in S130 is true.

It should be noted that the same preset value may be used as an increment in flow rate in one step in S160. In this case, the meter-in and meter-out pressure values gradually approach each other through feedback control. Alternatively, an increment in flow rate in S160 may be determined for each magnitude of the pressure difference calculated in S130 so as to quickly bring the meter-in and meter-out pressures closer.

On the other hand, when it is judged in S135 that the meter-in pressure is larger, this means, from FIG. 15, that the hydraulic motor 27 is producing a driving torque. Therefore, the hydraulic-electric combined swing control section 83 outputs, to the pump flow rate control section 90, a correction instruction (pump flow rate correction section) that reduces the flow rate of the hydraulic pump 41 from the immediately previous output flow rate (i.e., flow rate output in S125, S160, or S165) so as to bring the meter-in and meter-out pressure values closer (S165), and then returns to S130. When S165 is complete, the hydraulic-electric combined swing control section 83 returns to S130 to judge again whether the pressure difference is smaller than the setting value ϵ. The hydraulic-electric combined swing control section 83 controls the flow rate of the hydraulic pump 41 until the judgment in S130 is true. It should be noted that a decrement in flow rate in one step in S165 is set in a similar manner as for S160.

Controlling the flow rate of the hydraulic pump 41 as described above brings the different meter-in and meter-out pressure values closer even if these pressures are be different, thus keeping the torque produced by the hydraulic motor 27 to nearly zero level. This minimizes the loss of hydraulic parts and allows a swing motion of the upper swing structure 20 to be handled by the swing electric motor 25 alone that offers minimal loss, thus contributing to significantly reduced fuel consumption owing to improved energy efficiency during swing of the swing structure.

Further, in the above case, the flow rate of the hydraulic pump 41 controlled. This ensures direct reduction in loss associated with the hydraulic system, thus providing, as a major advantage, significant reduction in fuel consumption of the engine 22 as compared to the case illustrated in FIG. 17. Still further, the present control is also applicable when power supply to the electric motor 25 is restricted, thus offering, as an advantage, improved energy efficiency.

Although the examples illustrated in FIGS. 17 and 18 are premised on the assumption that the meter-out and meter-in pressures of the hydraulic motor 27 are brought in agreement, this is not essential. For example, when the upper swing structure 20 is accelerating or at a constant speed (during stead-state swing) with the operation amount of the swing control lever 72 falling within the fine operation region, the flow rate of the hydraulic pump 41 can be maintained at the standby flow rate. The inventor et al. have found that, in this case, the pump flow rate is maintained at a minimum level and provides significantly reduced loss of hydraulic parts, and that even if the meter-out pressure of the hydraulic motor 27 is larger than the meter-in pressure in this condition (i.e., even if the hydraulic motor 27 produces a braking torque), the energy efficiency of the system as a whole is better than when the upper swing structure 20 is driven by the hydraulic motor alone. A description will be given next of specific steps in this case with reference to FIG. 19.

FIG. 19 is a diagram illustrating a flowchart for controlling the torque of the swing electric motor 25 while maintaining the flow rate of the hydraulic pump 41 at the standby flow rate when the torque required to drive the upper swing structure 25 can be produced with the swing electric motor 25 alone. The steps in the flowchart illustrated in FIG. 19 are performed during operation of the swing control lever 72 as with those of the flowchart illustrated in FIG. 17. The steps from S100 to S115 and S150 are the same as in FIG. 17, and the description thereof will be omitted.

When it is judged in S115 of FIG. 19 that the required torque can be produced with the swing electric motor 25 alone, the hydraulic-electric combined swing control section 83 judges whether the operation pressure applied to the swing lever is equal to or less than the setting value β, that is, whether the operation amount of the swing control lever 72 is in the fine operation region (S170). When it is judged in S170 that the applied pressure is equal to or larger than the setting value β larger, the hydraulic-electric combined swing control section 83 outputs, to the power control unit 55, a torque instruction (swing electric motor torque instruction) demanding a torque value equivalent to the demanded torque in S110, thus allowing the swing electric motor 25 to be controlled by the inverter of the power control unit 55 based on the torque instruction (S120).

In this case, the hydraulic-electric combined swing control section 83 (pump flow rate correction calculation section 83g) outputs, to the pump flow rate control section 90, a pump flow rate correction instruction that maintains the pump flow rate at the standby flow rate (S175). As a result, the pump flow rate control section 90 maintains the flow rate of the hydraulic pump 41 at the standby flow rate.

In S130, the hydraulic-electric combined swing control section 83 judges whether the absolute value of the difference between the meter-in and meter-out pressures (pressure difference) of the swing hydraulic motor 27 is smaller than the setting value ϵ. When the pressure difference is smaller than the setting value ϵ, the hydraulic-electric combined swing control section 83 identifies that the meter-in and meter-out pressures are equal. When the pressure difference is smaller than the setting value ϵ in step S130, the hydraulic-electric combined swing control section 83 returns to S100 without handling the swing electric motor torque instruction, repeating the subsequent steps as described above.

On the other hand, when the pressure difference is equal to or larger than the setting value ϵ in S130, the hydraulic-electric combined swing control section 83 judges whether the meter-out pressure is larger than the meter-in pressure based on the input pressure values from the pressure sensors 87a and 87b (S135). When it is judged in S135 that the meter-out pressure is larger than the meter-in pressure, this means, from FIG. 11, that the hydraulic motor 27 is producing a braking torque. Nevertheless, the system efficiency is higher than in conventional machines. Therefore, the hydraulic-electric combined swing control section 83 returns to S100 without handling the torque instruction for the swing electric motor 25, repeating the subsequent steps as described above.

On the other hand, when it is judged in S135 that the meter-in pressure is larger, this means, from FIG. 11, that the hydraulic motor 27 is producing a driving torque. Therefore, the hydraulic-electric combined swing control section 83 increases the torque instruction for the swing electric motor 25 from the immediately previous output pressure (i.e., pressure output in S120 or S180) so as to bring the meter-in and meter-out pressure values closer (S180), and then returns to S130. When S180 is complete, the hydraulic-electric combined swing control section 83 returns to S130 to judge again whether the pressure difference is smaller than the setting value ϵ. The hydraulic-electric combined swing control section 83 controls the torque of the swing electric motor 25 until the judgment in S130 is true. It should be noted that an increment in torque in one step in S180 is set in a similar manner as for the case of FIG. 17.

Incidentally, when it is judged in S170 that the applied pressure exceeds the setting value β, the hydraulic-electric combined swing control section 83 proceeds to S120 in FIG. 17 or 18 to perform the steps in each figure. Then, when the end (RETURN) of the flowchart is reached, the hydraulic-electric combined swing control section 83 returns to FIG. 19 to proceed with the steps from S100 onward. It should be noted that whether to proceed to S120 in FIG. 17 or 18 may be set in advance. Alternatively, this selection may be made manually with a selector or other switch. It should be noted that the case where it is judged that the applied pressure exceeds the setting value β corresponds to the case where the upper swing structure 20 is swinging in a steady-state manner with the operation amount beyond β. During steady-state swing, the demanded torque drops sufficiently. Therefore, the demanded torque may be produced with the swing electric motor 25 alone. This also corresponds to the cases in FIGS. 17 and 18. Among specific cases where the steps from S120 onward are performed in the flowcharts of these two figures is the case where the upper swing structure 20 is swinging in a steady-state manner.

Controlling the torque of the swing electric motor 25 as described above brings the meter-in and meter-out pressure values closer to those values where the system efficiency improves even if these pressure values are different to each other. This minimizes the loss of hydraulic parts and allows a swing motion of the upper swing structure 20 to be handled by the swing electric motor 25 alone that offers minimal loss, thus contributing to significantly reduced fuel consumption owing to improved energy efficiency during swing of the swing structure.

It should be noted that, in S170, whether to proceed to S120 is classified by judging whether the operation amount of the swing control lever 72 is in the fine operation region. However, a step that judges whether the hydraulic pump 41 can be maintained at the standby flow rate may be performed rather than the step in S170.

Thus, the present embodiment keeps, to a minimum, the total loss caused by driving the swing hydraulic motor 27 and the swing electric motor 25 by optimally controlling the torque of the swing electric motor 25 or the flow rate of the hydraulic pump 41, thus contributing to optimal system efficiency during swinging. That is, energy can be used effectively without impairing the operator's operational feeling of the machine, thus contributing to reduced fuel consumption.

It should be noted that although a description has been given of control of the torque of the swing electric motor 25 with the flow rate of the hydraulic pump 41 maintained constant and control of the flow rate of the hydraulic pump 41 with the torque of the swing electric motor 25 maintained constant for easy understanding of the present invention, both the torque of the swing electric motor 25 and the flow rate of the hydraulic pump 41 or at least either of them may be controlled so long as a condition can be created where the meter-in and meter-out pressures of the swing hydraulic motor 27 are equal to each other.

Further, in the above description, the torque of the swing electric motor 25 or the flow rate of the hydraulic pump 41 is controlled in a feedback manner while detecting the meter-in and meter-out pressures of the swing hydraulic motor 27 with the pressure sensors 87a and 87b such that the difference between the two pressures falls within a predetermined range for improved system efficiency. Instead, however, the following control scheme may be used. That is, a target torque of the swing electric motor 25 or a target flow rate of the hydraulic pump 41 that keeps the meter-in and meter-out pressures of the hydraulic motor 27 within a predetermined range is set in advance for each combination of the swing pilot pressure and the rotation speed of the swing electric motor 25. These settings are stored in the form of a table in the storage device or the like of the controller 80. Then, the table is searched for the torque value of the swing electric motor 25 or the flow rate value of the hydraulic pump 41 associated with the swing pilot pressure and the rotation speed of the swing electric motor 25 detected by various sensors. The found torque value or flow rate value is used as a target value to control the torque or flow rate. Still further, if this control procedure is conducted, the series of steps shown in FIGS. 17 to 19 may be performed to eliminate any error that may result from the regulation based on the table through feedback control, thus contributing to improved accuracy. Application of two control schemes as described above provides significantly improved responsiveness and accuracy associated with control according to the present invention.

It should be noted that although a description has been given above by taking, as a specific example, a hydraulic excavator, the present invention is applicable to other construction machines such as cranes so long as such machines include an upper swing structure and have a mechanism that drives the upper swing structure with electric and hydraulic motors.

Further, the present invention is not limited to the above embodiment and includes various modification examples without departing from the gist of the invention. For example, the present invention is not limited to embodiments that include all the components described in the above embodiment and also includes those with some of the components omitted.

Still further, each of the components, functions thereof, and execution and processing of such functions, and so on associated with the above controller 80 may be partially or wholly implemented by hardware (i.e., designing a logic for executing each function in the form of an integrated circuit). Alternatively, each of the components of the controller 80 may be a program (software) that implements the function of that component making up the controller 80 as the program is read and executed by an arithmetic processing unit (e.g., CPU). Information associated with the program can be stored, for example, in a semiconductor memory (e.g., flash memory, SSD), a magnetic storage device (e.g., hard disk drive), and storage media (e.g., magnetic disks and optical disks).

Further, control and information lines considered necessary for description of the present embodiment are shown in the above description, and not all such lines associated with the product may be shown. It is safe to consider that almost all components are connected to each other.

DESCRIPTION OF REFERENCE CHARACTERS

20: Upper swing structure
22: Engine
24: Capacitor
25: Swing electric motor
26: Speed-reducing mechanism
27: Swing hydraulic motor
30: Excavator mechanism
31: Boom
32: Boom cylinder
33: Arm
34: Arm cylinder
35: Bucket 36: Bucket cylinder
44: Swing spool
40: Hydraulic system
41: Hydraulic pump
42: Control valve
51: Chopper
52: Inverter for swing electric motor
54: Smoothing capacitor
55: Power control unit
56: Main contact
70: Ignition key
71: Gate lock lever device
72: Swing control lever
73: Control lever (for use other operations than swing)
74: Hydraulic-electric signal converter (pressure sensor)
75: Electric-hydraulic signal converter
76: Pilot pressure shutoff valve
77: Hydraulic-only swing mode fixing switch
80: Controller
81: Fault monitoring/fault processing control section
82: Energy management control section
83: Hydraulic-electric combined swing control section
83a: Target powering torque calculation section
83b: Limit gain calculation section
83c: Limit torque calculation section
83d: Torque instruction value calculation section
83e: Hydraulic pump output reduction control section
83g: Pump flow rate correction calculation section
84: Hydraulic-only swing control section
86: Speed sensor
87: Pressure sensor
88: Regulator
90: Pump flow rate control section

The invention claimed is:

1. A construction machine comprising:
   a swing structure;
   a hydraulic motor for driving the swing structure;
   an electric motor for driving the swing structure and being mechanically connected to the hydraulic motor;
   a hydraulic pump being driven by a prime mover and for supplying hydraulic fluid to the hydraulic motor;
   an operating device configured to instruct the swing structure to make a swing motion; and
   a control device configured to, when demanded torque necessary for the swing motion of the swing structure instructed by the operating device can be produced by the electric motor alone, control at least either a delivery flow rate of the hydraulic pump or an output torque of the electric motor in such a manner that meter-out and meter-in pressures of the hydraulic motor that is run together with the electric motor approach each other, or in such a manner that the meter-out pressure is larger than the meter-in pressure.

2. The construction machine of claim 1,
   wherein the demanded torque is determined based on operation amount of the operating device and the rotation speed of the swing structure.

3. The construction machine of claim 2,
   wherein, when the swing structure is accelerating in a fine operation region where the operation amount of the operating device is equal to or less than a reference value, or when the rotation speed of the swing structure is constant regardless of the operation amount of the operating device,
   the control device, with maintenance of the delivery rate of the hydraulic pump at a predetermined value, controls the output torque of the electric motor such that the meter-out and meter-in pressures approach each other, or such that the meter-out pressure is larger than the meter-in pressure.

4. The construction machine of claim 2,
   wherein, when the swing structure is accelerating in a fine operation region where the operation amount of the operating device is equal to or less than the reference value, or when the rotation speed of the swing structure is constant regardless of the operation amount of the operating device,
   the control device, with maintenance of output torque of the electric motor at a predetermined value, controls the delivery rate of the hydraulic motor such that the meter-out and meter-in pressures approach each other, or such that the meter-out pressure is larger than the meter-in pressure.

5. The construction machine according to claim 3,
   wherein, when the swing structure is accelerating with the operation amount of the operating device falling within the fine operation region, the control device, with maintenance of the delivery rate of the hydraulic pump at a standby flow rate, controls the output torque of the electric motor such that the meter-out and meter-in pressures approach each other, or such that the meter-out pressure is larger than the meter-in pressure.

* * * * *